United States Patent
Tao

(12) 
(10) Patent No.: US 11,472,546 B2
(45) Date of Patent: Oct. 18, 2022

(54) FIXED-WING SHORT-TAKEOFF-AND-LANDING AIRCRAFT AND RELATED METHODS

(71) Applicant: Aurora Flight Sciences Corporation, Manassas, VA (US)

(72) Inventor: Tony Shuo Tao, Somerville, MA (US)

(73) Assignee: AURORA FLIGHT SCIENCES CORPORATION, Manassas, VA (US)

(*) Notice: Subject to any disclaimer, the term of this patent is extended or adjusted under 35 U.S.C. 154(b) by 430 days.

(21) Appl. No.: 16/799,393

(22) Filed: Feb. 24, 2020

(65) Prior Publication Data

US 2021/0261245 A1    Aug. 26, 2021

(51) Int. Cl.
*B64C 29/00* (2006.01)
*B64C 1/14* (2006.01)
(Continued)

(52) U.S. Cl.
CPC ........ *B64C 29/0025* (2013.01); *B64C 1/1407* (2013.01); *B64C 9/00* (2013.01);
(Continued)

(58) Field of Classification Search
CPC .... B64C 29/0025; B64C 1/1407; B64C 39/08
See application file for complete search history.

(56) References Cited

U.S. PATENT DOCUMENTS

| 1,987,788 A | * | 1/1935 | Morton | ................... B64C 39/08 244/56 |
| 3,119,441 A | * | 1/1964 | Furry, Jr. | ............... B64C 1/1407 244/129.5 |

(Continued)

FOREIGN PATENT DOCUMENTS

| EP | 3466812 | 4/2019 |
| GB | 935715 | 9/1963 |

(Continued)

OTHER PUBLICATIONS

European Patent Office, Extended European Search Report for related European Patent Application No. 21158638, dated Jun. 23, 2021.

*Primary Examiner* — Brian M O'Hara
(74) *Attorney, Agent, or Firm* — Dascenzo Gates Intellectual Property Law, P.C.

(57) ABSTRACT

Fixed-wing short-takeoff-and-landing aircraft and related methods. The aircraft comprise an airframe comprising a rear wing assembly and a forward wing assembly positioned forward of the rear wing assembly, a rear plurality of blowing rotor assemblies operatively coupled to the rear wing assembly that are configured to blow air across the rear wing assembly to induce lift in the rear wing assembly, and a forward plurality of blowing rotor assemblies that are operatively coupled to the forward wing assembly and configured to blow air across the forward wing assembly to induce lift in the forward wing assembly. The methods comprise inducing lift in a forward wing assembly by blowing air across the forward wing assembly with a forward plurality of blowing rotor assemblies and inducing lift in a rear wing assembly by blowing air across a rear wing assembly with a rear plurality of blowing rotor assemblies.

20 Claims, 9 Drawing Sheets

(51) Int. Cl.
*B64C 39/08* (2006.01)
*B64C 9/00* (2006.01)
*B64C 11/28* (2006.01)
*B64C 23/02* (2006.01)
*B64D 27/20* (2006.01)
*B64D 27/24* (2006.01)

(52) U.S. Cl.
CPC .............. *B64C 11/28* (2013.01); *B64C 23/02* (2013.01); *B64C 39/08* (2013.01); *B64D 27/20* (2013.01); *B64D 27/24* (2013.01); *B64C 2009/005* (2013.01)

(56) References Cited

U.S. PATENT DOCUMENTS

| | | | |
|---|---|---|---|
| D210,809 S | 4/1968 | Stearman | |
| 4,453,684 A * | 6/1984 | Hanks | B64C 1/24 105/430 |
| D277,976 S | 3/1985 | Holloway et al. | |
| 4,739,957 A | 4/1988 | Vess et al. | |
| 4,989,808 A * | 2/1991 | Spraggins | B64C 1/1438 244/129.5 |
| D616,804 S | 6/2010 | Manley et al. | |
| D628,528 S | 12/2010 | Cabezas Carrasco | |
| D630,996 S | 1/2011 | Gall et al. | |
| D642,968 S | 8/2011 | Zhao | |
| D651,156 S | 12/2011 | Gundlach | |
| D691,547 S | 10/2013 | Hall et al. | |
| 8,622,334 B2 | 1/2014 | Drela et al. | |
| 8,721,383 B2 | 5/2014 | Woodworth et al. | |
| 8,800,912 B2 * | 8/2014 | Oliver | B64D 27/06 244/66 |
| D712,310 S | 9/2014 | Gundlach et al. | |
| D725,576 S | 3/2015 | Vickers | |
| 9,010,683 B2 | 4/2015 | Gundlach et al. | |
| D732,458 S | 6/2015 | Dutertre | |
| D733,029 S | 6/2015 | Dutertre | |
| 9,085,355 B2 | 7/2015 | DeLorean | |
| D736,140 S | 8/2015 | Moller | |
| D739,807 S | 9/2015 | Strand et al. | |
| 9,346,542 B2 * | 5/2016 | Leng | B64C 27/26 |
| D763,733 S | 8/2016 | Gattelli et al. | |
| 9,475,579 B2 | 10/2016 | Fredericks et al. | |
| 9,505,484 B1 | 11/2016 | Al-Sabah | |
| 9,562,773 B2 | 2/2017 | Paduano et al. | |
| D795,160 S | 8/2017 | Koppenwallner | |
| D799,402 S | 10/2017 | Cummings | |
| D807,273 S | 1/2018 | Koppenwallner | |
| D808,328 S | 1/2018 | Ivans et al. | |
| D809,448 S | 2/2018 | Schmiderer et al. | |
| D810,621 S | 2/2018 | Sadek | |
| D813,143 S | 3/2018 | Belik et al. | |
| D822,579 S | 7/2018 | Lienhard et al. | |
| D824,321 S | 7/2018 | Ivans et al. | |
| D824,804 S | 8/2018 | Tian | |
| D829,633 S | 10/2018 | Cummings | |
| D832,141 S | 10/2018 | Ferner | |
| D833,364 S | 11/2018 | Schmiderer et al. | |
| D844,537 S | 4/2019 | MacAndrew et al. | |
| D845,169 S | 4/2019 | Cui et al. | |
| 10,252,815 B2 | 4/2019 | Murugappan et al. | |
| 10,273,003 B2 * | 4/2019 | Coulson | A62C 3/0235 |
| D850,357 S | 6/2019 | Cummings | |
| D872,681 S | 1/2020 | Tzarnotzky et al. | |
| D873,200 S | 1/2020 | Langford, III et al. | |
| 10,533,356 B2 * | 1/2020 | Amante | B64C 1/1407 |
| 10,543,905 B1 | 1/2020 | Kwon et al. | |
| D875,022 S | 2/2020 | Cummings | |
| 10,625,852 B2 * | 4/2020 | Bevirt | B64C 39/068 |
| 2015/0344134 A1 | 12/2015 | Cruz Ayoroa | |
| 2016/0214710 A1 | 7/2016 | Brody et al. | |
| 2017/0003690 A1 | 1/2017 | Tanahashi | |
| 2018/0079503 A1 | 3/2018 | Ivans et al. | |
| 2018/0162525 A1 | 6/2018 | St. Clair et al. | |
| 2018/0215465 A1 | 8/2018 | Renteria | |
| 2019/0127056 A1 | 5/2019 | Weekes et al. | |
| 2019/0135424 A1 | 5/2019 | Baity et al. | |
| 2019/0256194 A1 | 8/2019 | Vander Lind et al. | |
| 2019/0291863 A1 * | 9/2019 | Lyasoff | G05D 1/102 |
| 2020/0164972 A1 | 5/2020 | Kiesewetter et al. | |
| 2020/0269975 A1 | 8/2020 | Fink et al. | |
| 2021/0031910 A1 | 2/2021 | Cornes | |
| 2021/0206483 A1 | 7/2021 | Lee et al. | |
| 2022/0009626 A1 | 1/2022 | Baharav et al. | |

FOREIGN PATENT DOCUMENTS

| | | |
|---|---|---|
| WO | WO 2015/143093 | 9/2015 |
| WO | WO 2016/018486 | 2/2016 |
| WO | WO 2019/202325 | 10/2019 |
| WO | WO 2019/211875 | 11/2019 |

* cited by examiner

FIXED-WING SHORT-TAKEOFF-AND-LANDING AIRCRAFT AND RELATED METHODS

FIELD

The present disclosure generally relates to short takeoff and landing aircraft.

BACKGROUND

In the aviation industry, there is a strong and growing interest for aircraft that can takeoff and land without the use of large runways. For example, various military and urban air mobility operations look to utilize aviation within environments that do not offer the runway lengths needed for takeoff and landing with conventional fixed-wing aircraft. Traditionally, the need for aircraft that can operate without the use of large runways has been addressed with vertical-takeoff-and-landing (VTOL) aircraft, such as helicopters, multi-rotors, and compound rotor and wing configurations, where lift is achieved with lift rotors. While VTOL aircraft can takeoff and land without runways, VTOL aircraft frequently are less efficient, operate at lower flight speeds, and generate high levels of noise relative to fixed-wing aircraft.

Short-takeoff-and-landing (STOL) aircraft are another class of aircraft that are being considered as a solution to address the runway limitations of conventional fixed-wing aircraft. Unlike VTOL aircraft, STOL aircraft typically are fixed-wing aircraft that leverage various aerodynamic principals, such as low wing loading, to permit the STOL aircraft to takeoff and land with shorter runways. In general, STOL aircraft tend to be more efficient and operate at higher flight speeds relative to VTOL aircraft; however, application of STOL aircraft in certain environments remains limited due to longer runway requirements compared to VTOL.

More recent STOL aircraft designs utilize a blown-lift effect to reduce takeoff distance, in which a series of rotors are utilized to blow air across, and generate lift in, a fixed-wing of the aircraft. However, in view of enabling short takeoff distances, existing blown-lift STOL aircraft designs tend to be lightly wing loaded, which can render the aircraft more susceptible to wind disturbances and cause for low control authority during landing. As such, application of existing blown-lift STOL aircraft may be constrained by the need for a larger landing distance caused by the low control authority over landing dispersion. Thus, a need exists for STOL aircraft that are more controllable and can be precisely controlled through takeoff and landing.

SUMMARY

Fixed-wing short-takeoff-and-landing aircraft having multiple blown surfaces and related methods for operating an aircraft are disclosed herein. The aircraft comprise an airframe comprising a rear wing assembly and a forward wing assembly that is positioned within the airframe forward of the rear wing assembly. The aircraft further comprise a rear plurality of blowing rotor assemblies operatively coupled to the rear wing assembly proximate to leading edge regions of the rear wing assembly, in which the rear plurality of blowing rotor assemblies are configured to blow air across the rear wing assembly to induce lift in the rear wing assembly, and a forward plurality of blowing rotor assemblies operatively coupled to the forward wing assembly proximate to leading edge regions of the forward wing assembly, in which the forward plurality of blowing rotor assemblies are configured to blow air across the forward wing assembly to induce lift in the forward wing assembly.

The methods comprise inducing lift in a forward wing assembly of the fixed-wing short-takeoff-and-landing aircraft by blowing air across the forward wing assembly with a forward plurality of blowing rotor assemblies that are operatively coupled to the forward wing assembly proximate to leading edge regions of the forward wing assembly. The methods further comprise inducing lift in a rear wing assembly of the aircraft by blowing air across the rear wing assembly with a rear plurality of blowing rotor assemblies that are operatively coupled to the rear wing assembly proximate to leading edge regions of the rear wing assembly.

DESCRIPTION

Figure 1:
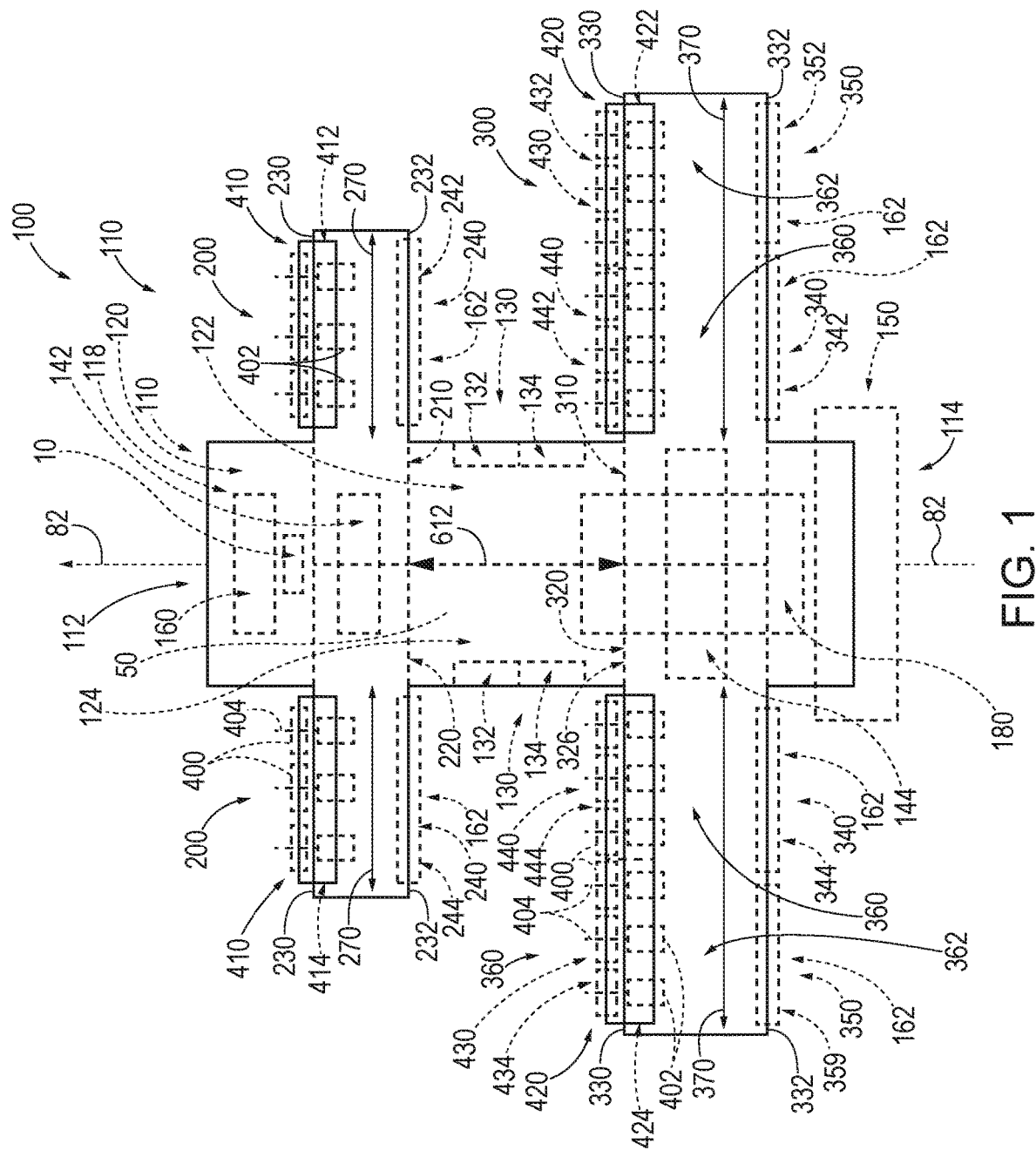
FIG. 1 is a diagram that schematically represents aircraft, according to the present disclosure.

Fixed-wing short-takeoff-and-landing aircraft having multiple blown surfaces and related methods are discussed herein. FIGS. 1-9 provide examples of aircraft 100, electrical systems 20 for aircraft 100, and related methods 500 for operating aircraft 100, according to the present disclosure. Elements that serve a similar, or at least a substantially similar, purpose are labelled with like numbers in each of FIGS. 1-9, and these elements may not be discussed in detail herein with reference to each of FIGS. 1-9. Similarly, all elements may not be labelled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure.

Figure 5:
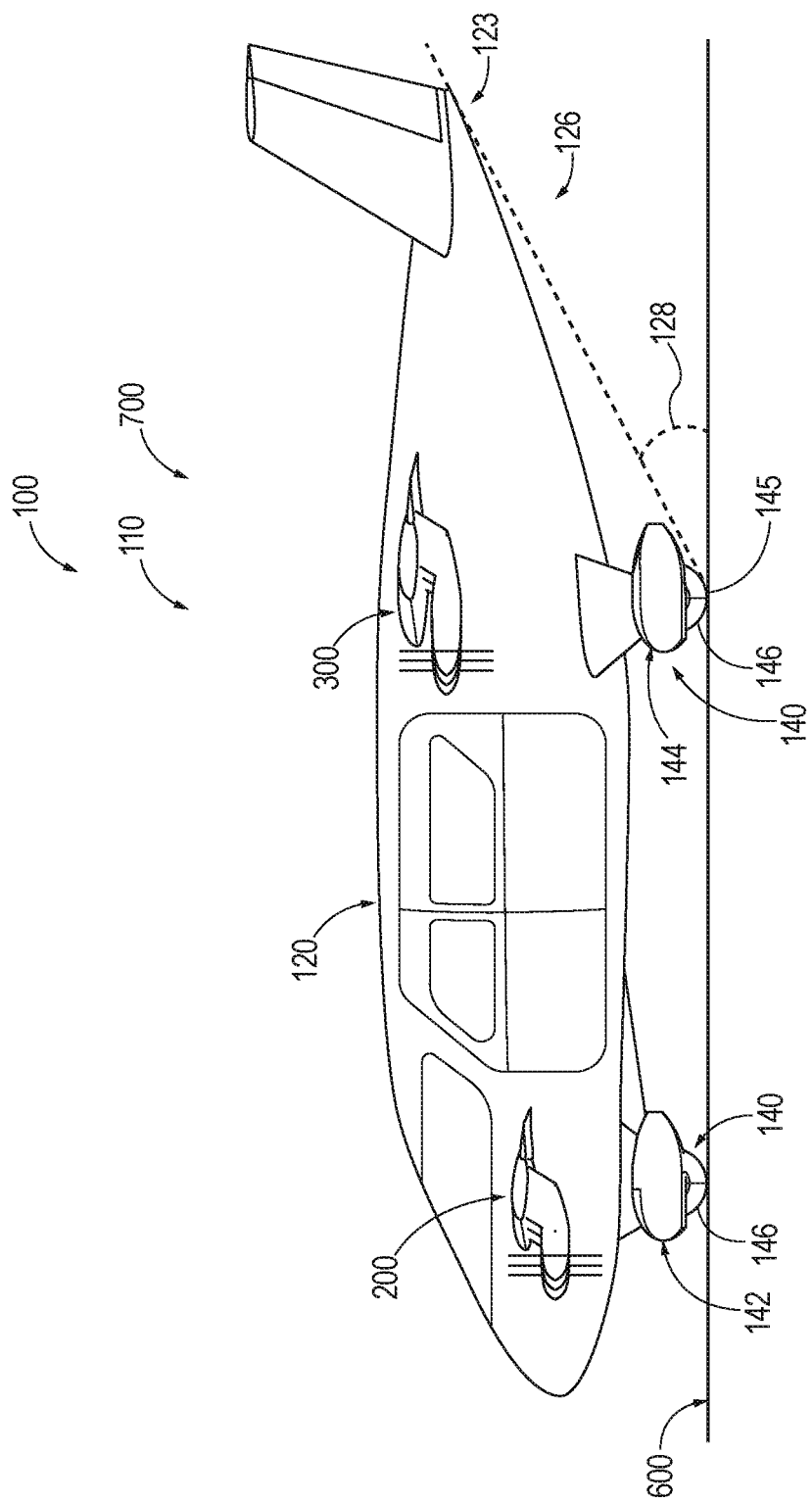
FIG. 5 is a side view of the example aircraft of FIG. 2.
Figure 6:
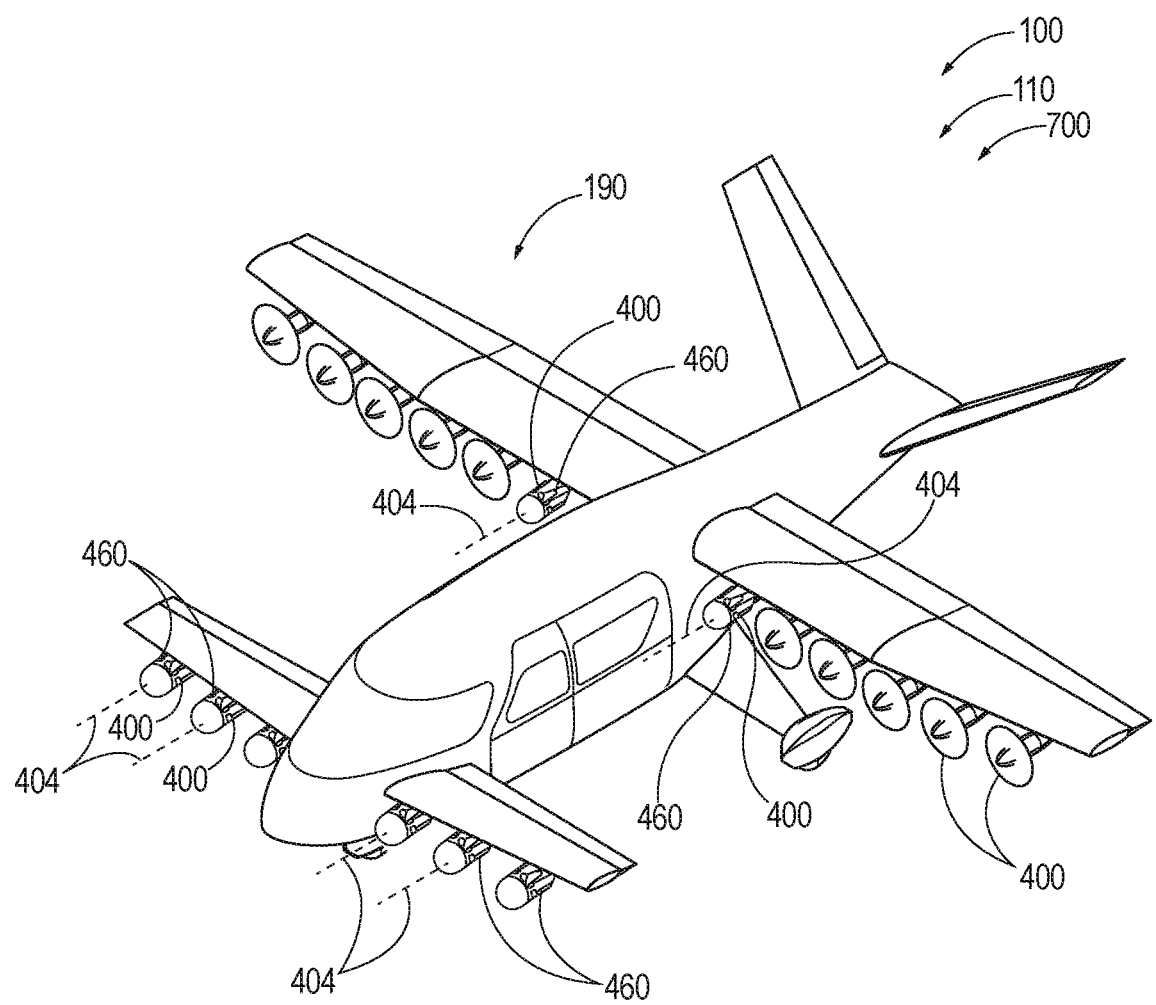
FIG. 6 is another isometric view of the example aircraft of FIG. 2, shown in a cruise configuration.
Figure 7:
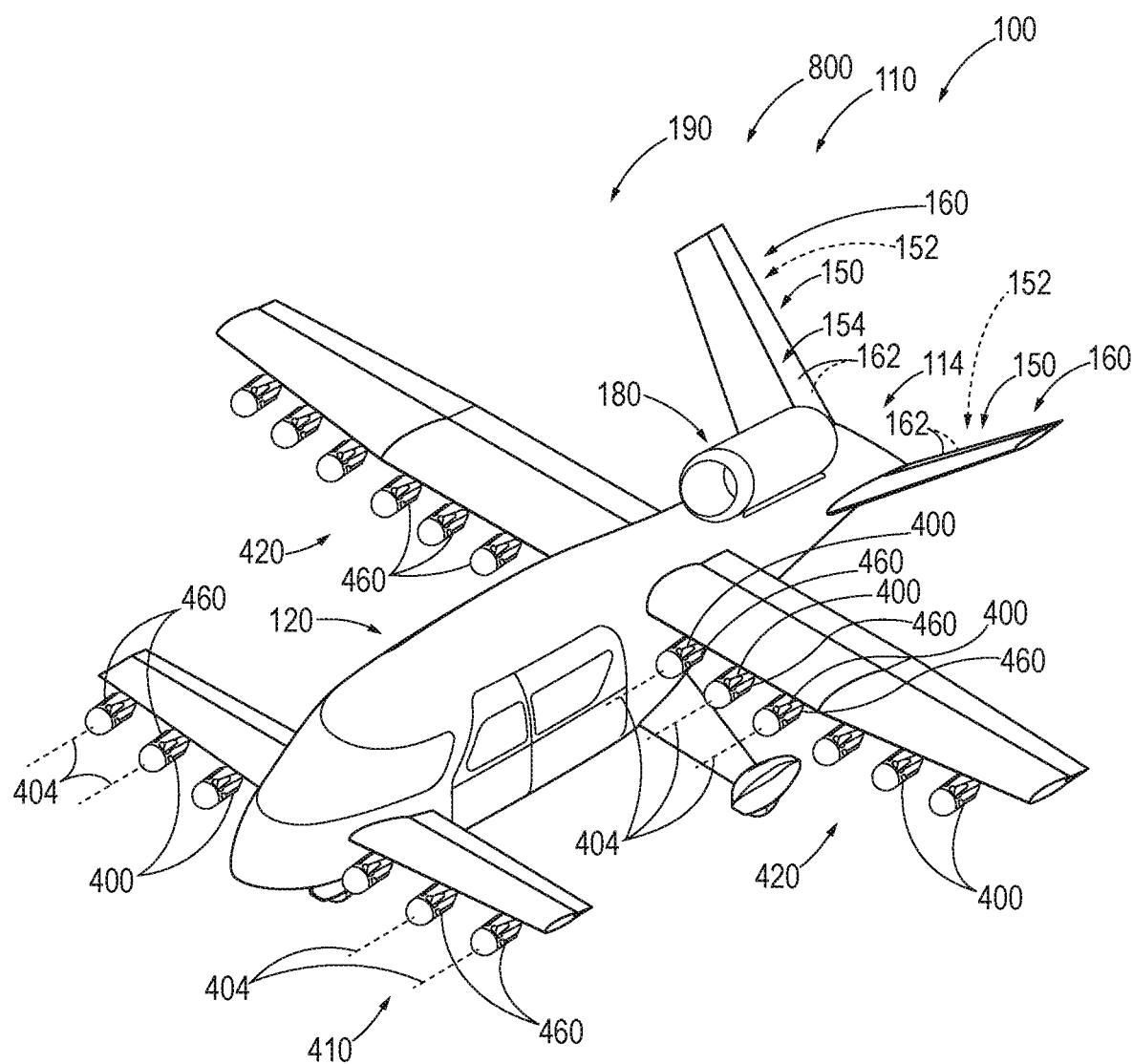
FIG. 7 is an isometric view of another example aircraft, according to the present disclosure.
Figure 8:
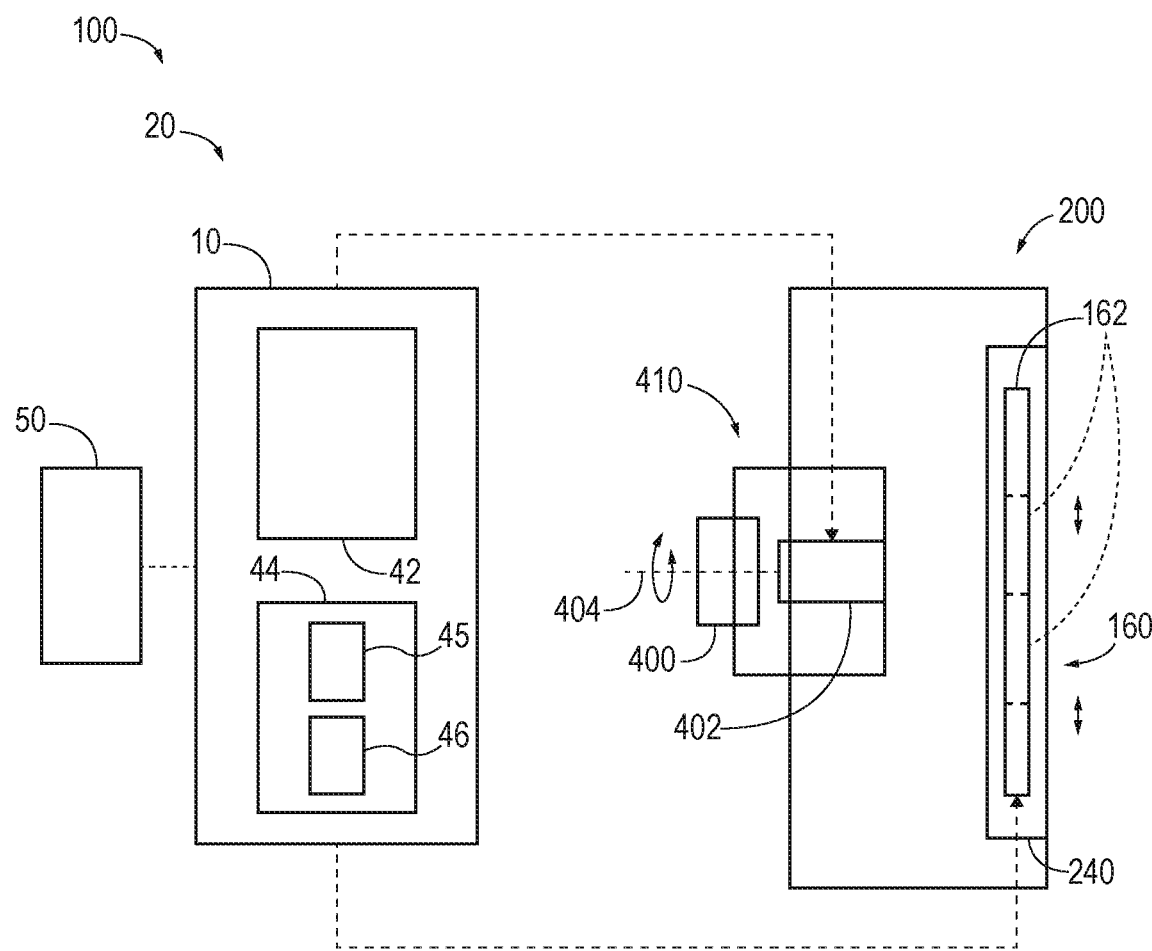
FIG. 8 is a diagram that schematically represents an example controller that may be utilized in aircraft, according to the present disclosure.

FIG. 1 schematically represents aircraft 100 according to the present disclosure, FIGS. 2-6 illustrate an example aircraft 100 indicated at and referred to herein as aircraft 700, FIG. 7 illustrates an example aircraft 100 indicated at and referred to herein as aircraft 800, and FIG. 8 schematically represents example electrical systems 20 of aircraft 100. Generally, in FIG. 1, elements that are likely to be included in a given (i.e., particular) example of aircraft 100 are illustrated in solid lines, while elements that are optional to a given example of aircraft 100 are illustrated in dashed lines. However, elements that are illustrated in solid lines in FIG. 1 are not essential to all examples of aircraft 100 of the present disclosure, and an element shown in solid lines in FIG. 1 may be omitted from a particular example of aircraft 100 without departing from the scope of the present disclosure. The following discussion concentrates on the schematic representation of aircraft 100 in FIG. 1; however, where appropriate and to facilitate an understanding of aircraft 100, references to the illustrative, non-exclusive examples of aircraft 700 and 800 in FIGS. 2-6 and FIG. 7, respectively, are made. Example aircraft 700 and 800 are non-exclusive and do not limit aircraft 100 to the illustrated embodiments of FIGS. 2-7. That is, aircraft 100 according to the present disclosure may incorporate any number of the various aspects, configurations, characteristics, properties, etc. of aircraft 100 that are illustrated in and discussed with reference to the schematic representations of FIGS. 1 and 8 and/or the embodiments of FIGS. 2-7, as well as variations thereof, without requiring the inclusion of all such aspects, configurations, characteristics, properties, etc. For the purpose of brevity, each discussed component, part, portion, aspect, region, etc. or variants thereof may not be discussed, illustrated, and/or labeled with respect to aircraft 700 and 800; however, it is within the scope of the present disclosure that the discussed features, variants, etc. of aircraft 100 may be utilized with aircraft 700 and 800. Likewise, the specific illustrated and discussed aspects of aircraft 700 and 800 may be utilized with other aircraft 100 according to the present disclosure.

With initial reference to FIG. 1, aircraft 100 comprise an airframe 110 that comprises a forward wing assembly 200 and a rear wing assembly 300. Aircraft 100 also comprise a forward plurality of blowing rotor assemblies 410 that are operatively coupled to forward wing assembly 200 and a rear plurality of blowing rotor assemblies 420 that are operatively coupled to rear wing assembly 300. In some examples, aircraft 100 comprise a fuselage 120 to which forward wing assembly 200 and rear wing assembly 300 are operatively coupled. In some examples, fuselage 120 comprises an internal volume that is configured to receive a payload, and optionally comprises one or more access doors 130 that are configured to permit access to the internal volume of fuselage 120. Aircraft 100 further may comprise an empennage assembly 150, a landing gear assembly 140, and/or one or more flight control surfaces 160.

Aircraft 100 may take any suitable form including commercial aircraft, military aircraft, private aircraft, cargo aircraft, passenger aircraft, or any other suitable aircraft. Likewise, aircraft 100 may be a piloted aircraft, a semiautonomous aircraft, an autonomous aircraft, and/or a remote controlled aircraft.

Aircraft 100 may be described as a short-takeoff-and-landing (STOL) aircraft. For example, aircraft 100 may be configured to be operated within an urban environment and/or may be configured to takeoff and land with a runway of less than 40 meters. Aircraft 100 is a fixed wing aircraft, in which forward wing assembly 200 and rear wing assembly 300 are fixedly positioned within, not configured to pivot within, and/or non-rotatably fixed within airframe 110. Likewise, in some examples, forward blowing rotor assemblies 410 and rear blowing rotor assemblies 420 may be fixedly positioned relative to the respective wing assembly, and/or not configured to pivot relative to the respective wing assembly. Stated another way, in some examples, each forward blowing rotor assembly 410 and/or each rear blowing rotor assembly 420 comprises a blowing rotor 400 that is configured to rotate about a rotational axis 404. In some examples, rotational axis 404 is a fixed axis of rotation. In such examples, rotational axis 404 may be fixed relative to a chord of the respective wing assembly, fixed relative to airframe 110, and/or fixed relative to a longitudinal axis 82 of aircraft 100. In view of the above, aircraft 100 may differ from winged vertical takeoff and landing (winged-VTOL) aircraft, which include wings and/or rotors that pivot.

As schematically illustrated in FIG. 1, aircraft 100 may be described as having a longitudinal axis 82 that extends centrally through aircraft 100 in a positive direction from an aft region 114 of aircraft 100 through a nose region 112 of aircraft 100. In the present disclosure, a first structure may be referred to as a forward structure and/or as being forward of a second structure. In this context, the first structure may be located within aircraft 100, in a positive direction along longitudinal axis 82 from the second structure. Likewise, a third structure may be referred to as being a rear structure and/or as being rear of a fourth structure. In this context, the fourth structure may be located within aircraft 100, in a positive direction along longitudinal axis 82 from the third structure.

Additionally or alternatively, in the present disclosure, a particular structure may be referred to as having a left portion and/or a right portion. Likewise, a particular structure may be referred to as being a left structure or a right structure. In this context, the left structure or the left portion may be located within aircraft 100 left of longitudinal axis 82 when aircraft 100 is viewed from above, or illustrated in a top plan view, such as in FIG. 2. Similarly, the right structure or the right portion may be located within aircraft 100 to the right of longitudinal axis 82 when aircraft 100 is viewed from above, or illustrated in a top plan view.

As illustrated in FIG. 1, aircraft 100 comprises airframe 110 that comprises rear wing assembly 300 and forward wing assembly 200, in which forward wing assembly 200 is positioned forward of rear wing assembly 300 within airframe 110. Aircraft 100 also comprises a rear plurality of blowing rotor assemblies 420 that are operatively coupled relative (i.e., adjacent) to leading edge regions 330 of rear wing assembly 300 and configured to blow air across rear wing assembly 300 to induce lift in rear wing assembly 300. Aircraft 100 further comprises a forward plurality of blowing rotor assemblies 410 that are operatively coupled relative (i.e., adjacent) to leading edge regions 230 of forward wing assembly 200 and configured to blow air across forward wing assembly 200 to induce lift in forward wing assembly 200. In some examples, each blowing rotor assembly of the forward plurality of blowing rotor assemblies 410 and/or each blowing rotor assembly of the rear plurality of blowing rotor assemblies 420 additionally is configured to propel air rearwardly to induce thrust in aircraft 100.

As discussed herein, forward plurality of blowing rotor assemblies 410 also may be referred to as a forward set of blowing rotor assemblies, forward blowing rotor assemblies, forward blowing rotors, and/or forward blowing propeller assemblies. Likewise, as discussed herein, rear plurality of blowing rotor assemblies 420 also may be referred to as a rear set of blowing rotor assemblies, rear blowing rotor assemblies, rear blowing rotors, and/or rear blowing propeller assemblies. In some of the examples discussed herein, generic reference is made to a blowing rotor assembly and/or blowing rotor assemblies. In such examples, the features, attributes, functions, and/or elements, discussed in relation to the generic blowing rotor assembly and/or generic blowing rotor assemblies may be comprised in and/or be respective to each of, and/or any of, the forward blowing rotor assemblies and the rear blowing rotor assemblies. Stated another way, in some examples, the forward blowing rotor assemblies and the rear blowing rotor assemblies comprise common features, attributes, functions, and/or elements, which may be discussed generally as being comprised in and/or respective to a blowing rotor assembly and/or blowing rotor assemblies.

In some of the examples discussed herein, one or more elements may be described in relation to one or more "respective" elements, such as a respective wing assembly, respective blowing rotor assemblies, and/or a respective blowing rotor assembly. In such examples, the term "respective" may refer to a first element, and/or first set of elements that are discussed herein as being associated with, operatively coupled to, and/or otherwise interacting with a second element and/or a second set of elements.

In some examples, forward blowing rotor assemblies 410 and/or rear blowing rotor assemblies 420 are configured to blow, propel, and/or direct jet streams of air across an under surface and an upper surface of a respective wing assembly. With this in mind, forward wing assembly 200 and rear wing assembly 300 each may be described as defining one or more blown surfaces that are blown by the respective blowing rotor assemblies. Thus, as discussed herein, forward wing assembly 200 also may be referred to as forward blown surface, and rear wing assembly 300 also may be referred to as rear blown surface.

In some examples, forward wing assembly 200 comprises one or more flight control surfaces 160 that are configured to direct air flowing across forward wing assembly 200, such as air blown by forward blowing rotor assemblies 410, such as to facilitate maneuvering of aircraft 100. As an example, flight control surfaces 160 of forward wing assembly 200 may be configured to selectively and operatively direct the jet streams of air, and/or adjust velocities thereof, directed across the under and upper surfaces of forward wing assembly 200 by forward blowing rotor assemblies 410 to control lift induced in forward wing assembly 200 by forward blowing rotor assemblies 410 and thrust induced in aircraft 100 by forward blowing rotor assemblies 410. As illustrated in FIG. 1, in some examples, flight control surfaces 160 of forward wing assembly 200 comprise one or more forward flaps 240 that, in some such examples, each define at least a portion of a trailing edge 232 of forward wing assembly 200.

Similarly, in some examples, rear wing assembly 300 comprises one or more flight control surfaces 160 that are configured to direct air flowing across rear wing assembly 300, such as air blown by rear plurality of blowing rotor assemblies 420, such as to facilitate maneuvering of aircraft 100. As an example, flight control surfaces 160 of rear wing assembly 300 may be configured to selectively and operatively direct the jet streams of air, and/or adjust velocities thereof, directed across the under and upper surfaces of rear wing assembly 300 by rear blowing rotor assemblies 420 to control lift induced in rear wing assembly 300 by rear blowing rotor assemblies 420 and thrust induced in aircraft 100 by rear blowing rotor assemblies 420. For instance, as illustrated in FIG. 1, in some examples, rear wing assembly 300 comprises one or more rear flaps 340 that may define inboard portions 360 of a trailing edge 332 of rear wing assembly 300. Additionally or alternatively, rear wing assembly 300 comprises one or more ailerons 350 that may define outboard portions 362 of trailing edge 332 of rear wing assembly 300.

As discussed herein, in some examples, each flight control surface 160 comprises one or more flight control surface actuators 162 that are configured to operatively and selectively adjust the flight control surface 160, such as to control the selective and operative directing of the jet stream of air by the flight control surface 160. In some examples, the one or more flight control surface actuators 162 comprised in each flight control surface 160 are configured to be selectively and independently operated, such as to adjust the respective flight control surface 160, optionally independently of any other flight control surface 160.

Figure 9:
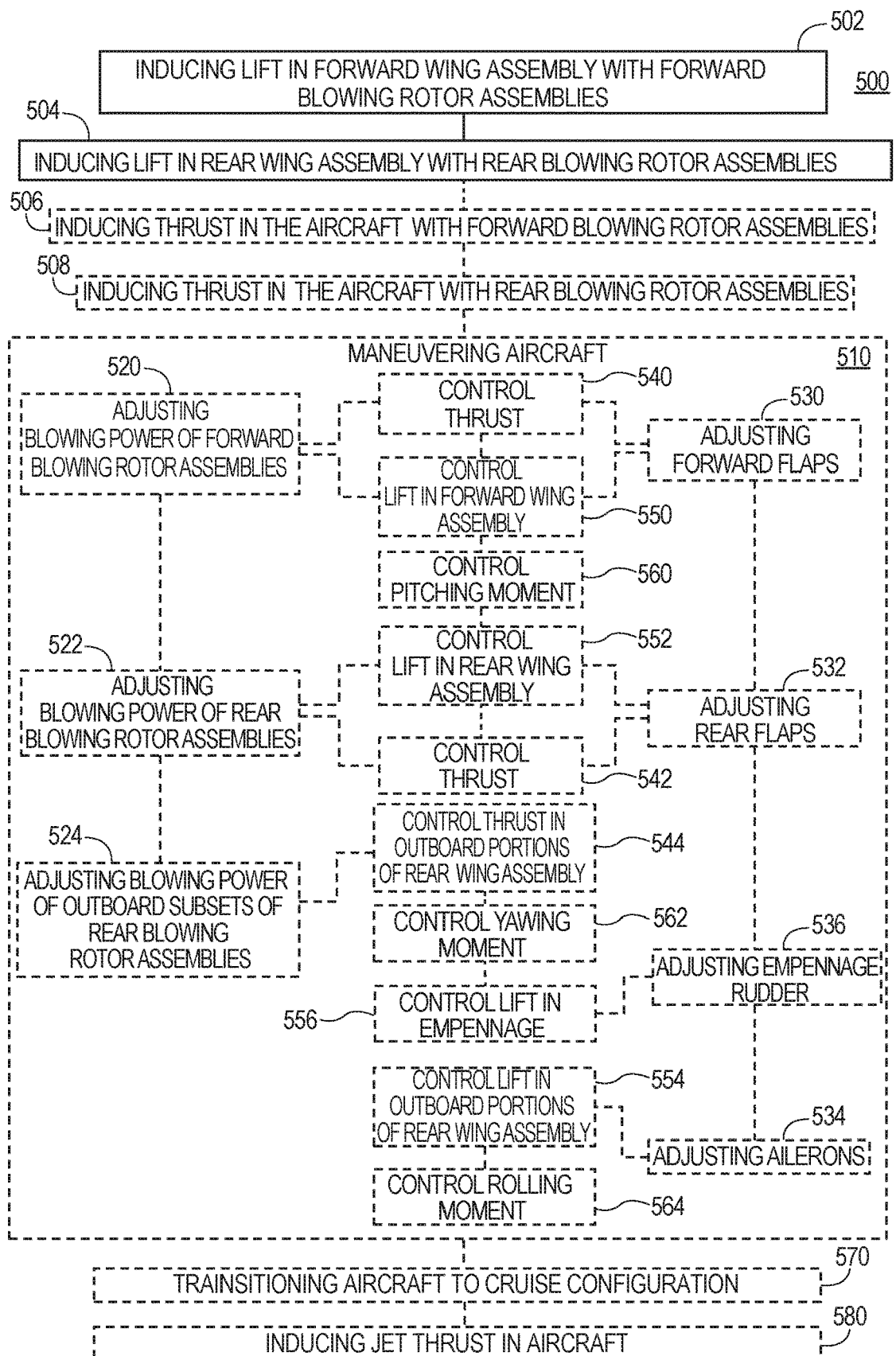
FIG. 9 is a flow chart schematically representing methods of operating aircraft, according to the present disclosure.

As discussed in more detail herein with reference to FIG. 9 and methods 500, in some examples, forward blowing rotor assemblies 410 and/or rear blowing rotor assemblies 420 are selectively and operatively controlled to facilitate maneuvering of aircraft 100. As shown in FIG. 1, in some examples, each forward blowing rotor assembly 410 and/or each rear blowing rotor assembly 420 comprises blowing rotor 400 that is configured to rotate about rotational axis 404 to blow air across the respective wing assembly. In some such examples, each forward blowing rotor assembly 410 and/or each rear blowing rotor assembly 420 further comprises a motor 402 that is configured to power rotation of a respective blowing rotor 400. In some such examples, each motor 402 is electrically powered and/or comprises an electric motor.

During operation of aircraft 100, forward blowing rotor assemblies 410, rear blowing rotor assemblies 420, and/or subsets thereof may output a blowing power that is controlled to induce lift and/or thrust. In some examples, each forward blowing rotor assembly 410, each rear blowing rotor assembly 420, and/or subsets thereof may be described as being configured to output a differential blowing power, in which the blowing power of a particular blowing rotor assembly, or subset of blowing rotor assemblies, is operatively and selectively controlled independently of the other blowing rotor assemblies. For example, responsive to independent operation, each forward blowing rotor assembly 410, each rear blowing rotor assembly 420, and/or subsets thereof may be configured to output a differential blowing power to control one or more of a pitching moment in aircraft 100, a yawing moment in aircraft 100, a rolling moment in aircraft 100, and/or a velocity in aircraft 100.

As a more specific example, in some examples, the differential blowing power of a particular blowing rotor is operatively controlled by controlling power directed to a respective motor. As yet a more specific example, when the respective motor 402 is electrically powered, the differential blowing power of the particular blowing rotor may be operatively controlled by controlling an electrical power directed to the respective motor 402.

Aircraft 100 comprises any suitable number of forward blowing rotor assemblies 410, with examples including at least 4 forward blowing rotor assemblies, at least 6 forward blowing rotor assemblies, at least 8 forward blowing rotor assemblies and/or at most 10 forward blowing rotor assemblies. Aircraft 100 also comprises any suitable number of rear blowing rotor assemblies 420, with examples including at least 6 rear blowing rotor assemblies, at least 8 rear blowing rotor assemblies, at least 10 rear blowing rotor assemblies, at least 12 rear blowing rotor assemblies, and/or at most 20 rear blowing rotor assemblies.

As schematically represented in FIG. 1, in some examples, forward wing assembly 200 and rear wing assembly 300 are separated along a length of aircraft 100 and/or longitudinal axis 82 by a longitudinal separation 612. In some examples, forward wing assembly 200 and rear wing assembly 300 are longitudinally separated across a center of gravity of the aircraft, in which forward wing assembly 200 is positioned within airframe 110 forward of the center of gravity and rear wing assembly 300 is positioned within airframe 110 rear of the center of gravity. As perhaps more clearly illustrated with respect to example aircraft 700 in FIG. 3, longitudinal separation 612 may be defined as a separation between trailing edge 232 of forward wing assembly 200 at longitudinal axis 82, and/or a projection thereto (illustrated in dashed lines) and leading edge region 330 of rear wing assembly 300 at longitudinal axis 82, and/or a projection thereto (illustrated in dashed lines). Stated another way, aircraft 100 may be described as comprising a forward blown surface that is longitudinally separated from a rear blown surface. Such a configuration may permit aircraft 100 to takeoff with a shorter runway relative to a traditional STOL aircraft, at least in part because of the large pitching moment that is available to aircraft 100 as a result of having a forward blown surface and a rear blown surface. More specifically, forward blowing rotor assemblies 410 may be utilized to operatively generate lift in forward wing assembly 200, and thus lift in the nose region of aircraft 100, during takeoff, thus allowing for a steeper takeoff pitching angle relative to traditional STOL aircraft. As a more specific example, lift induced in forward wing assembly 200 by forward blowing rotor assemblies 410 may permit aircraft 100 to takeoff with a runway length of at most 20 meters, at most 30 meters, at most 40 meters, at most 50 meters, 60 meters, and/or at most 100 meters. Stated another way, aircraft 100 may be configured to takeoff with the runway lengths defined above.

Maneuverability of aircraft 100, at least in part, is determined by longitudinal separation 612 between the forward blown surface and the rear blown surface. For example, a shorter longitudinal separation 612 may induce lower maximum dynamic loads on airframe 110 and/or reduce vehicle inertia while a larger longitudinal separation 612 may increase the pitching moment induced in aircraft 100 by differential in lift the forward wing assembly 200 and the rear wing assembly 300. Additionally or alternatively, longitudinal separation 612 provides space for a payload to be loaded and unloaded from the aircraft 100 when an access door 130 is positioned between the forward wing assembly 200 and the rear wing assembly 300. With this in mind, aircraft 100 comprises a longitudinal separation 612 of any suitable value, which may be defined as a threshold fraction of a total length of aircraft 100. As examples, the threshold fraction may be at least 20%, at least 30%, at least 40%, at least 50%, at least 60%, at most 70%, at most 75%, at most 80%, and/or at most 100%.

Additionally or alternatively, maneuverability of aircraft 100 is at least in part determined by a total extensive length 270 of forward wing assembly 200 relative to a total extensive length 370 of rear wing assembly 300. For example, total extensive length 270 relative to total extensive length 370 may influence the aerodynamic center of aircraft 100. As discussed herein, the total extensive length of a particular wing assembly may be defined as a length of the wing assembly measured along a leading edge of the wing assembly. As illustrated in FIG. 1, in some examples, forward wing assembly 200 comprises a forward left wing portion 220 and a forward right wing portion 210. In such examples, total extensive length 270 of forward wing assembly 200 includes the combined lengths of forward left wing portion 220 measured along the leading edge of forward left wing portion 220 and forward right wing portion 210 measured along the leading edge of forward right wing portion. Likewise, when rear wing assembly 300 comprises a rear right wing portion 310 and a rear left wing portion 320, total extensive length 370 of rear wing assembly includes the combined lengths of rear right wing portion 310 measured along the leading edge of rear right wing portion 310 and rear left wing portion 320 measured along the leading edge of rear left wing portion 320.

In some examples, the total extensive length 270 of forward wing assembly 200 is defined as a threshold fraction of the total extensive length 370 of rear wing assembly 300, with examples of the threshold fraction including at least 10%, at least 15%, at least 20%, at least 30%, at least 40%, at least 50%, at least 60%, at most 70%, at most 80%, at most 90%, and/or at most 100%. In some examples, the threshold fraction of total extensive length 270 to total extensive length 370 is selected such that the aerodynamic center of aircraft 100 coincides with a center of gravity of aircraft 100. For example, it may be beneficial for the total extensive length 270 of forward wing assembly 200 to be smaller than the total extensive length 370 of rear wing assembly 300. In such examples, forward wing assembly 200 is a canard wing assembly, and rear wing assembly 300 is a main wing assembly.

Figure 4:
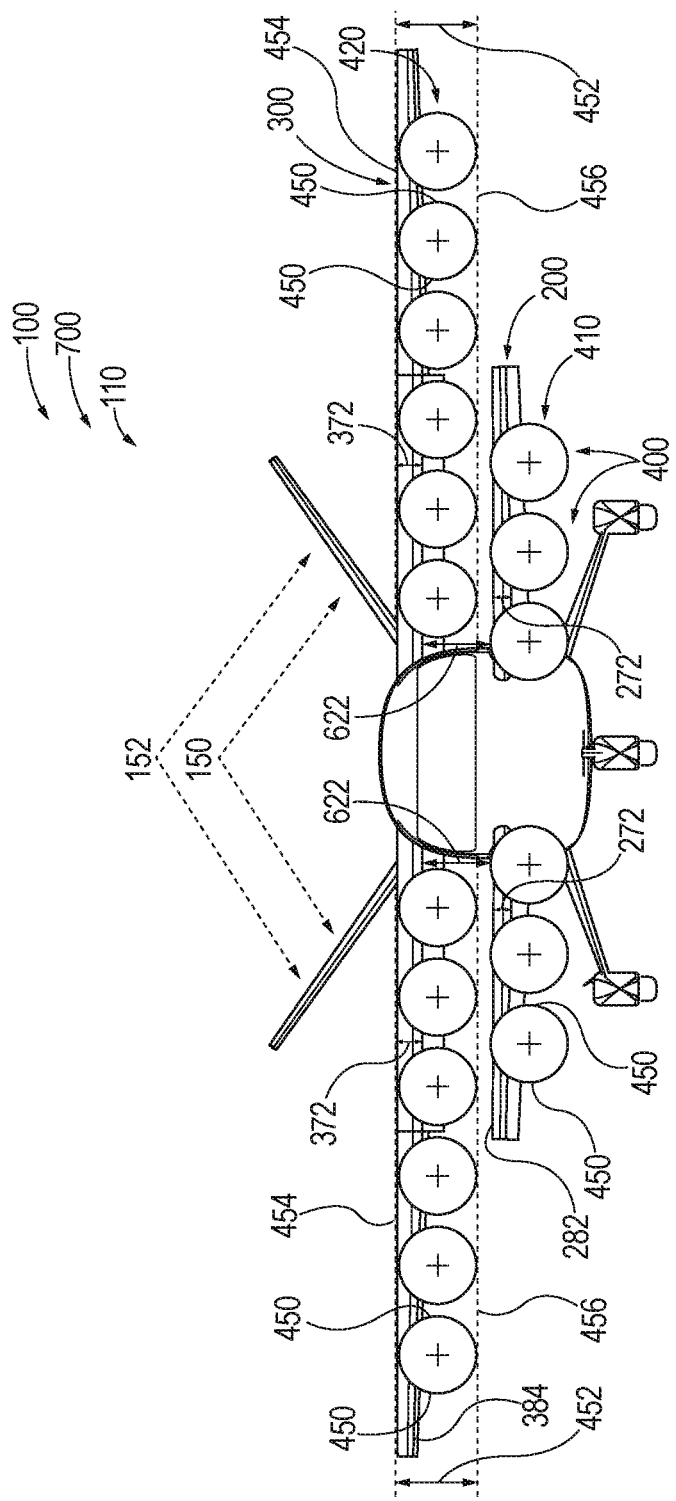
FIG. 4 is a front view of the example aircraft of FIG. 2.

As schematically shown with respect to example aircraft 700 in FIG. 4, each forward blowing rotor assembly 410 and/or each rear blowing rotor assembly 420 of aircraft 100 may be described as having a spinning diameter 450, which is defined herein as a total diameter cleared by a respective blowing rotor 400 during rotation of the blowing rotor. In such examples, the spinning diameter of any particular blowing rotor assembly is selected to possess any suitable value. The spinning diameter of a particular blowing rotor assembly may be selected to be the same as or different from the spinning diameter of any other blowing rotor assembly. In some examples, forward blowing rotor assemblies 410 each possess the same spinning diameter, and rear blowing rotor assemblies 420 each possess the same spinning diameter. In some such examples, the spinning diameters of forward blowing rotor assemblies 410 are selected to be the same as the spinning diameters of rear blowing rotor assemblies 420. Alternatively, in some other such examples, the spinning diameters of the forward blowing rotor assemblies 410 are selected to be different from the spinning diameters of rear blowing rotor assemblies 420.

In some examples, forward blowing rotor assemblies 410 define a cumulative spinning diameter that is a sum of the spinning diameters of the forward blowing rotor assemblies 410. In some examples, the cumulative spinning diameter of the forward blowing rotor assemblies is selected to be a threshold fraction of the total extensive length 270 of forward wing assembly 200. Examples of the threshold fraction include at least 50%, at least 60%, at least 70%, at least 80%, at most 90%, and/or at most 95%. The threshold fraction of the cumulative spinning diameter of the forward blowing rotor assemblies 410 to total extensive length 270 may at least partially define a blown length percentage of forward wing assembly 200. The blown length percentage of forward wing assembly 200 may be defined as a percentage of the length of forward wing assembly 200 that is blown by forward blowing rotor assemblies 410, and may at least partially determine a maximum amount of lift that can be generated in forward wing assembly 200 by forward blowing rotor assemblies 410. As an example, a larger threshold fraction, or blown length percentage, may increase the maximum amount of lift that can be generated in forward wing assembly 200 by forward blowing rotor assemblies 410, and a smaller threshold fraction may decrease the maximum amount of lift that can be generated in forward wing assembly 200 by forward blowing rotor assemblies 410.

Similarly, in some examples, rear blowing rotor assemblies 420 define a cumulative spinning diameter which may be selected to be a threshold fraction of the total extensive length 370 of rear wing assembly 300. Examples of the threshold fraction include at least 50%, at least 60%, at least 70%, at least 80%, at most 90%, and/or at most 95%. As discussed herein with respect to the forward wing assembly, the threshold fraction of the cumulative spinning diameter of rear blowing rotor assemblies 420 to total extensive length 370 may at least partially define a blown surface length of rear wing assembly 300, which may at least partially determine a maximum amount of lift that can be generated in rear wing assembly 300 by rear blowing rotor assemblies 420.

Forward blowing rotor assemblies 410 and rear blowing rotor assemblies 420 may comprise any suitable cumulative spinning diameters. As examples, forward blowing rotor assemblies 410 may comprise a cumulative spinning diameter that is the same as, or less than, a cumulative spinning diameter of rear blowing rotor assemblies 420.

Figure 3:
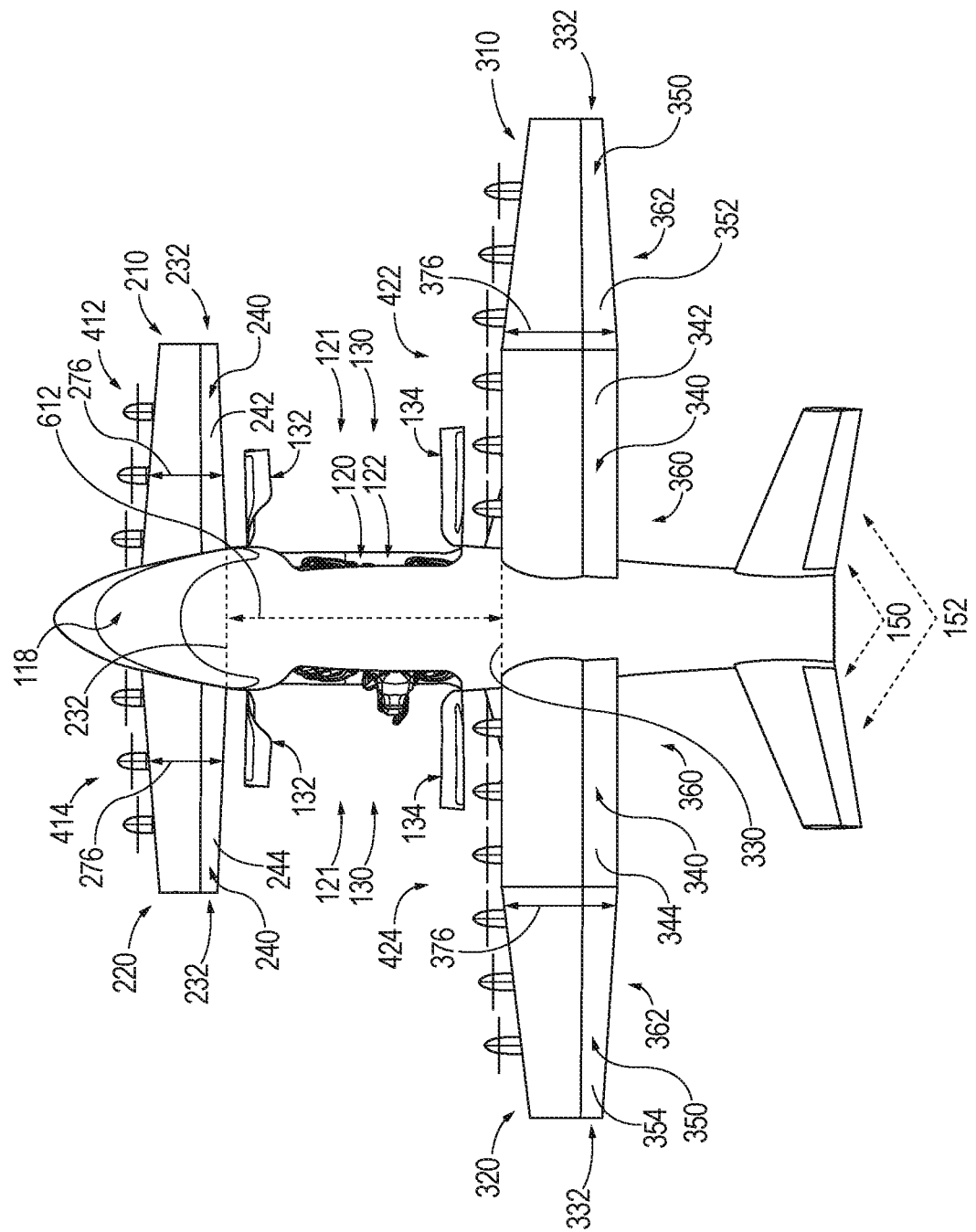
FIG. 3 is a top-plan view of the example aircraft of FIG. 2.

As schematically shown with respect to example aircraft 700 in FIG. 3, forward wing assembly 200 of aircraft 100 may be described as having an average blown width 276 (i.e., an average chord length) of forward wing assembly 200 within a region that is blown by forward blowing rotor assemblies 410. Likewise, rear wing assembly 300 of aircraft 100 may be described as having an average blown width 376 (i.e. an average chord length) of rear wing assembly 300 within a region that is blown by rear blowing rotor assemblies 420. Forward wing assembly 200 and rear wing assembly 300 each may comprise any suitable average blown width. As examples, average blown width 276 of forward wing assembly 200 may be the same as, greater than, or less than the average blown width 376 of rear wing assembly 300.

In some examples, average blown width 276 of forward wing assembly 200 at least partially determines the maximum lift that can be induced in forward wing assembly 200 by forward blowing rotor assemblies 410. Likewise, in some examples, average blown width 376 of rear wing assembly 300 at least partially determines the maximum lift that can be induced in rear wing assembly 300 by rear blowing rotor assemblies 420. With this in mind, in some examples, aircraft 100 is configured such that the spinning diameter of each forward blowing rotor assembly 410 and/or the spinning diameter of each rear blowing rotor assembly 420 is at most a maximum threshold of the average blown width of the respective wing assembly. In some examples, the spinning diameters of forward blowing rotor assemblies 410 and/or rear blowing rotor assemblies 420 relative to the average blown width of the respective wing assembly at least partially determine the relative amounts of lift and thrust induced by the blowing rotor assemblies at a given blowing power. For example, a smaller number of blowing rotor assemblies that each possess a large spinning diameter relative to the average blown width of the respective wing assembly generally may induce more thrust in the aircraft and less lift in the respective wing assembly relative to a larger number of blowing rotor assemblies that each possess a smaller spinning diameter. That said, a wing assembly may become increasingly inefficient at effectively directing air from the respective blowing rotor assemblies when the threshold fraction of the spinning diameters of the respective blowing rotor assemblies to the average blown width of the wing assembly exceeds a certain value. As examples, aircraft 100 may be configured such that the spinning diameter of each forward blowing rotor assembly is at most 20%, at most 30%, at most 40%, at most 50%, at most 60%, at most 70%, at most 80%, and/or at most 90% of average blown width 276 of forward wing assembly 200. Additionally or alternatively, aircraft 100 may be configured such that the spinning diameter of each rear blowing rotor assembly 420 is at most 20%, at most 30%, at most 40%, at most 50%, at most 60%, at most 70%, at most 80%, and/or at most 90% of average blown width 376 of rear wing assembly 300.

As schematically illustrated with respect to example aircraft 700 in FIG. 4, forward wing assembly 200 of aircraft 100 may be described as comprising an average blown thickness 272, which may be defined by the average thickness of leading edge region 230 of forward wing assembly 200 within a region that is blown by forward blowing rotor assemblies 410. Likewise, rear wing assembly 300 of aircraft 100 may be described as comprising an average blown thickness 372 (i.e. the average thickness) of leading edge region 330 of rear wing assembly 300 that is blown by rear blowing rotor assemblies 420. In some examples, aircraft 100 is configured such that the spinning diameters of forward blowing rotor assemblies 410 and/or rear blowing rotor assemblies 420 possess a particular value relative to the average blown thickness of the respective wing assembly. As an example, aircraft 100 may be configured such that the spinning diameter 450 of each forward blowing rotor assembly 410 is a threshold fraction of average blown thickness 272 of forward wing assembly 200, with examples of the threshold fraction including at most 120%, at most 130%, at most 140%, at most 150%, at most 200%, and/or at most 300%. Likewise, aircraft 100 may be configured such that the spinning diameter 450 of each rear blowing rotor assembly 420 is a threshold fraction of average blown thickness 372 of rear wing assembly 300, with examples of the threshold fraction including at most 120%, at most 130%, at most 140%, at most 150%, at most 200%, and/or at most 300%.

As further shown in FIG. 4 with reference to example aircraft 700, each forward blowing rotor assembly 410 may be positioned relative to forward wing assembly 200 such that a portion of spinning diameter 450 of each forward blowing rotor assembly 410 extends above leading edge region 230 of forward wing assembly 200 and a portion of spinning diameter 450 of each forward blowing rotor assembly 410 extends below leading edge region 230. Likewise, each rear blowing rotor assembly 420 may be positioned relative to rear wing assembly 300 such that a portion of spinning diameter 450 of each rear blowing rotor assembly 420 extends above leading edge region 330 of rear wing assembly 300 and a portion of spinning diameter 450 of each rear blowing rotor assembly 420 extends below leading edge region 330.

In some examples, it is beneficial for a larger portion of spinning diameter 450 of one or more forward blowing rotor assemblies 410 to extend below leading end region 230 relative to the portion of spinning diameter 450 that extends above leading edge region 230. As examples, at least 60%, at least 70%, at least 80%, and/or at least 90% of spinning diameter 450 of one or more forward blowing rotor assemblies 410 may extend below leading edge region 230 and/or at most 5%, at most 10%, at most 20%, at most 30%, and/or at most 40% of spinning diameter 450 of one or more forward blowing rotor assemblies 410 may extend above leading edge region 230. Similarly, in some examples, it is beneficial for a larger portion of spinning diameter 450 of one or more rear blowing rotor assemblies 420 to extend below leading end region 330 relative to the portion of spinning diameter 450 that extends above leading edge region 330. As examples, at least 60%, at least 70%, at least 80%, and/or at least 90% of spinning diameter 450 of one or more rear blowing rotor assemblies 420 may extend below leading edge region 330 and/or at most 5%, at most 10%, at most 20%, at most 30%, and/or at most 40% of spinning diameter 450 of one or more rear blowing rotor assemblies 420 may extend above leading edge region 330.

With continued reference to example aircraft 700 in FIG. 4, in some examples of aircraft 100, forward wing assembly 200 and rear wing assembly 300 are separated along a height of aircraft 100 by a vertical separation 622. Vertical separation 622 may be measured as minimum vertical separation between an upper surface 282 of forward wing assembly 200 and an under surface 384 of rear wing assembly 300 along the extensive length of the shorter of forward wing assembly 200 or rear wing assembly 300. For some examples in which forward wing assembly 200 and rear wing assembly 300 are separated by vertical separation 622, rear wing assembly 300 is positioned within airframe 110 at a higher waterline than a waterline of forward wing assembly 200.

In some examples, positioning forward wing assembly 200 at vertical separation 622 from rear wing assembly 300 within airframe 110 permits the convected wake of forward wing assembly 200 to be directed below rear wing assembly 300. With this in mind, in some examples, aircraft 100 is configured such that spinning diameter 450 of each forward blowing rotor assembly 410 is vertically non-overlapping with spinning diameter 450 of each rear blowing rotor assembly 420. As a more specific example, as illustrated with respect to example aircraft 700 in FIG. 4, spinning diameters 450 of rear blowing rotor assemblies 420 may define a maximum vertical extent 452 that is measured vertically between a highest 454 and a lowest 456 vertical extent of spinning diameters 450 of rear blowing rotor assemblies 420. In such examples, aircraft 100 may be configured such that vertical separation 622 between forward wing assembly 200 and rear wing assembly 300 is a threshold fraction of maximum vertical extent 452, with examples of the threshold fraction including at least 90%, at least 100%, at least 110%, at least 130%, at least 150%, at least 200%, at most 300%, and/or at most 400%.

Turning back with primary reference to FIG. 1, but also to example aircraft 700 in FIG. 3, as discussed herein, in some examples, forward wing assembly 200 and/or rear wing assembly 300 comprise one or more flight control surfaces 160. Each flight control surface 160 may be configured to direct air flowing across the respective wing assembly, such as air blown by the respective blowing rotor assemblies, to facilitate maneuvering of the aircraft. More specifically, in some examples, forward wing assembly 200 comprises one or more forward flaps 240 that, in some such examples, define at least a portion of trailing edge 232 of forward wing assembly 200. Forward flaps 240 may be configured to be selectively and operatively adjusted up and down, for example, such as to control lift in forward wing assembly 200. In some examples, rear wing assembly 300 comprises one or more rear flaps 340, which, in some such examples, define inboard portions 360 of trailing edge 332 of rear wing assembly 300. Additionally or alternatively, rear wing assembly 300 comprises one or more ailerons 350 that, in some examples, define outboard portions 362 of trailing edge 332 of rear wing assembly 300. In some examples, ailerons 350 and/or rear flaps 340 are configured to be operatively adjusted up and down, for example, such as to control lift in respective portions of rear wing assembly 300.

As discussed herein, in some examples, forward wing assembly 200 comprises forward left wing portion 220 and forward right wing portion 210. In such examples, forward blowing rotor assemblies 410 comprises a forward left subset of blowing rotor assemblies 414 that are operatively coupled to forward left wing portion 220 and a forward right subset of blowing rotor assemblies 412 that are operatively coupled to forward right wing portion 210. Likewise, in some examples, rear wing assembly 300 comprises rear right wing portion 310 and rear left wing portion 320. In such examples, rear blowing rotor assemblies 420 comprises a rear left subset of blowing rotor assemblies 424 that are operatively coupled to rear left wing portion 320 and a rear right subset of blowing rotor assemblies 422 that are operatively coupled to rear right wing portion 310.

When forward wing assembly 200 comprises forward left wing portion 220 and forward right wing portion 210, and further comprises forward flaps 240, forward flaps 240 comprise a forward right flap 242 that defines at least a portion of trailing edge 232 of forward right wing portion 210, and a forward left flap 244 that defines at least a portion of trailing edge 232 of forward left wing portion 220. In some such examples, forward left flap 244 is configured to direct air flowing across forward left wing portion 220, such as air blown by forward left subset of blowing rotor assemblies 414, and forward right flap 242 is configured to direct air flowing across forward right wing portion 210, such as air blown by forward right subset of blowing rotor assemblies 412. For example, forward left flap 244 may be configured to control lift induced in forward left wing portion 220 by forward left subset of blowing rotor assemblies 414, and forward right flap 242 may be configured to control lift induced in forward right wing portion 210 by forward right subset of blowing rotor assemblies 412.

In some examples, forward left flap 244 and forward right flap 242 are configured to be operated in unison, such as to control a pitching moment in aircraft 100. Additionally or alternatively, in some examples, forward left flap 244 and forward right flap 242 are configured to be operated independently, such as to control a rolling moment in the aircraft.

With continued reference to FIGS. 1 and 3, when rear wing assembly 300 comprises rear left wing portion 320 and rear right wing portion 310, and further comprises rear flaps 340, rear flaps 340 comprise a rear right flap 342 that may define inboard portion 360 of trailing edge 332 of rear right wing portion 310, and a rear left flap 344 that may define inboard portion 360 of trailing edge 332 of rear right wing portion 310. In some examples, rear left subset of blowing rotor assemblies 424 comprises a rear left inboard subset of blowing rotor assemblies 444 and rear right subset of blowing rotor assemblies 422 comprises a rear right inboard subset of blowing rotor assemblies 442. In some examples, rear right flap 342 is configured to direct air flowing across inboard portion 360 of rear right wing portion 310, such as air blown by rear right inboard subset of blowing rotor assemblies 442, and rear left flap 344 is configured to direct air flowing across inboard portion 360 of rear left wing portion 320, such as air blown by rear left inboard subset of blowing rotor assemblies 444.

In some examples, rear left flap 344 and rear right flap 342 are configured to be operated in unison, such as to control a pitching moment in aircraft 100. Additionally or alternatively, rear left flap 344 and rear right flap 342 are configured to be operated independently, such as to control a rolling moment in aircraft 100.

When rear wing assembly 300 comprises rear right wing portion 310 and rear left wing portion 320, and further comprise ailerons 350, ailerons comprise a left aileron 354 that may define outboard portion 362 of rear left wing portion 320 and a right aileron 352 that may define outboard portion 362 of rear right wing portion 310. In some examples, rear right subset of blowing rotor assemblies 422 comprises a rear right outboard subset of blowing rotor assemblies 432, and rear left subset of blowing rotor assemblies 424 comprises a rear left outboard subset of blowing rotor assemblies 434. In some examples, left aileron 354 is configured to direct air flowing over outboard portion 362 of rear left wing portion 320, such as air blown by rear left outboard subset of blowing rotor assemblies 434, and right aileron 352 is configured to direct air flowing over outboard portion 362 of rear right wing portion 310, such as air blown by rear right outboard subset of blowing rotor assemblies 432.

In some examples, left aileron 354 and right aileron 352 are configured to be operated in unison. Additionally or alternatively, left aileron 354 and right aileron 352 are configured to be operated independently, such as to control a rolling moment in aircraft 100.

Figure 2:
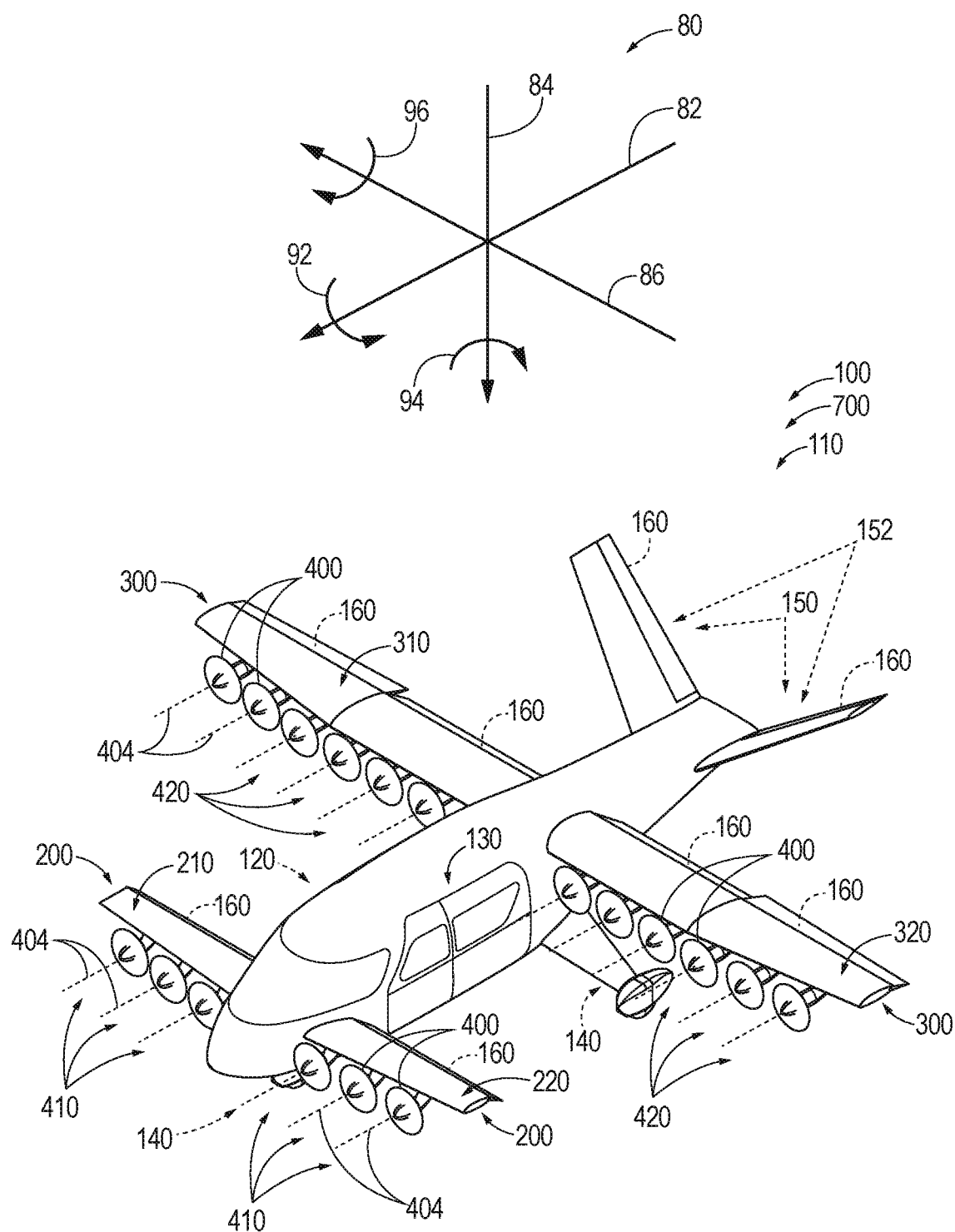
FIG. 2 is an isometric view of an example aircraft, according to the present disclosure.

As schematically illustrated in FIG. 1, and less schematically illustrated with respect to example aircraft 700 in FIGS. 2 and 3, in some examples, airframe 110 comprises fuselage 120. Fuselage 120 may be configured to receive and/or transport a payload 124, such as cargo and/or human passengers. In some such examples, fuselage 120 comprises an internal volume 122 that is configured to receive and/or transport payload 124. In some examples, internal volume 122 is configured to be pressurized and/or comprises a pressurized cabin for transporting human passengers. In some examples, fuselage 120 additionally or alternatively comprises a cockpit 118, which may be positioned along a nose region of fuselage 120. In some such examples, cockpit 118 comprises a flight control center for piloted control of aircraft 100.

When airframe 110 comprises fuselage 120, forward wing assembly 200 and rear wing assembly 300 may be operatively coupled to fuselage 120. More specifically, as illustrated in the example of FIG. 3, forward wing assembly 200 is operatively coupled to fuselage 120 forward of rear wing assembly 300, with longitudinal separation 612 extending therebetween. In some such examples, aircraft 100 is configured such that fuselage 120 supports payload 124 with a center of weight of payload 124 positioned between forward wing assembly 200 and rear wing assembly 300, and/or within longitudinal separation 612. Stated another way, longitudinally separating forward wing assembly 200 and rear wing assembly 300 along a length of fuselage 120 permits the center of weight of payload 124 to be supported within fuselage 120 proximate to a center of lift of aircraft 100.

Generally speaking, longitudinally separating forward wing assembly 200 and rear wing assembly 300 along the length of fuselage 120, and/or within airframe 110, provides several advantages over traditional blown-lift STOL aircraft that do not include a forward blown surface longitudinally spaced from a rear blown surface. First, positioning rear wing assembly 300 within airframe 110 rear of the center of mass of the payload deconflicts, both aerodynamically and structurally, the location of rear wing assembly 300 and the location of payload 124. Additionally, positioning rear wing assembly rear of the center of mass of payload 124, as opposed to above or below it, reduces height requirements of aircraft 100, thereby reducing drag and landing gear width requirements.

With continued reference to FIGS. 1 and 3, in some examples, fuselage 120 comprises one or more access doors 130 that are configured to permit access to the internal volume of fuselage 120. Fuselage 120 may comprise any suitable number of access doors 130, and access doors 130 may be positioned in any suitable location along fuselage 120. In some examples of aircraft 100, and in the specific example of aircraft 700 illustrated in FIG. 3, fuselage 120 comprises at least two access doors 130 that are positioned along opposing lateral side regions 121 of fuselage 120 between forward wing assembly 200 and rear wing assembly 300. In some examples, each access door 130 is configured to pivot open rearwardly, such as to shield ingress and egress of fuselage 120 from at least a portion of rear blowing rotor assemblies 420. Additionally or alternatively, such as in example aircraft 700, each access door 130 comprises a forward access door portion 132 that is configured to pivot open forwardly to shield at least a portion of forward blowing rotor assemblies 410.

As schematically represented in FIG. 1, and less schematically illustrated in FIG. 5 with respect to example aircraft 700, in some examples, aircraft 100 comprises landing gear assembly 140. In some examples, landing gear assembly is configured to support aircraft 100 on a ground surface 600. In some examples, landing gear assembly 140 is configured to support aircraft 100 on ground surface 600 during takeoff and landing. With this in mind, in some examples, landing gear assembly comprises one or more wheels 146 that are configured to permit aircraft 100 to roll along ground surface 600, such as during takeoff and landing.

In some examples, landing gear assembly 140 comprises a forward landing gear portion 142 and rear landing gear portion 144. In some such examples, forward landing gear portion 142 is positioned within airframe 110 proximally below forward wing assembly 200 and rear landing gear portion 144 is positioned within airframe 110 proximally below rear wing assembly 300. In some examples, positioning the forward 142 and rear 144 portions of landing gear assembly 140 respectively below the forward wing assembly and the rear wing assembly improves stability of aircraft 100 during takeoff and landing, while permitting aircraft 100 to takeoff with a steep pitch-up angle, such as discussed in more detail herein. As a more specific example, when airframe 110 comprises fuselage 120, forward landing gear portion 142 may be operatively coupled to fuselage 120 proximally below forward wing assembly 200, and rear landing gear portion 144 may be operatively coupled to fuselage 120 proximally below rear wing assembly 300.

Now with particular reference to FIG. 5, in some examples of aircraft 100, fuselage 120 comprises a tapered rear region 126. In some examples, fuselage 120 comprises tapered rear region 126 such that the rear of fuselage 120 does not encounter ground surface 600 when aircraft 100 takes off with a steep pitch-up angle. Stated another way, in some examples, tapered rear region 126 reduces runway requirements by permitting aircraft 100 to takeoff with steep pitch-up angle. As illustrated in FIG. 5, in some examples, aircraft 100 defines a pitch-up clearance angle 128. Pitch-up clearance angle 128 may be determined, at least in part, by a longitudinal position of rear landing gear portion 144, a vertical height of rear landing gear portion 144, and a taper of tapered rear region 126. More specifically, when aircraft 100 is viewed in a side profile, such as the perspective of FIG. 5, and aircraft 100 is supported on ground surface 600 by forward 142 and rear 144 landing gear portions, pitch-up clearance angle 128 is defined as an angle formed between ground surface 600, and a line extending between a ground contact point 145 of rear landing gear portion 144 and an aft most point 123 of an underside of fuselage 120. It is within the scope of the present disclosure that aircraft 100 comprises a pitch-up clearance of any suitable value such that aircraft 100 may takeoff with any suitable pitch-up angle.

Examples of pitch-up clearance angle 128 include at least 15°, at least 20°, at least 25°, at least 30°, at least 35°, at most 40°, and/or at most 45°.

Turning back to FIG. 1, in some examples, aircraft 100 comprises a jet engine 180 that is operatively coupled to airframe 110. When included, jet engine 180 is configured to provide and/or induce a jet thrust in aircraft 100, such as to propel aircraft 100. In some examples, jet engine 180 is beneficial when aircraft 100 is operated over longer flight durations and/or distances, as jet engine 180 may permit higher flight velocities with aircraft 100 relative to that afforded by the blown rotor assemblies alone. In view of the above, and as discussed in more detail herein, in some examples, jet engine 180 may be utilized to propel aircraft 100 while aircraft 100 is in a cruise configuration and/or has reached a cruising altitude. With this in mind, in some examples, jet engine 180 is configured to be activated at any suitable time during operation of aircraft 100, such as when aircraft 100 has reached a cruising altitude and/or during transitioning of aircraft 100 to the cruise configuration.

Jet engine 180 may be mounted in any suitable position within airframe 110, comprise any suitable type of jet engine, and be powered by any suitable power source. In some examples, jet engine 180 comprises a turbofan jet engine. In some examples, jet engine 180 is electrically powered, gas powered, and/or hybrid powered. As an example, when airframe 110 comprises fuselage 120, jet engine 180 may be operatively coupled to fuselage 120. Example aircraft 800 in FIG. 7 illustrates a specific example of aircraft 100 comprising jet engine 180. As shown in this example, jet engine 180 is mounted over fuselage 120 rear of rear wing assembly 300. Stated another way, in this example, jet engine 180 comprises an over-fuselage mounted jet engine 180.

As schematically illustrated in FIG. 1, in some examples, airframe 110 comprises an empennage assembly 150. When included in airframe 110, empennage assembly 150 is configured to stabilize and/or facilitate maneuvering of aircraft 100. It is within the scope of the present disclosure that empennage assembly 150 comprises any suitable type of empennage assembly. Examples of suitable empennage assembly types include a T-tail empennage assembly, a fuselage mounted empennage assembly, and/or a V-tail empennage assembly. In some examples, empennage assembly 150 comprises one or more flight control surfaces, such as one or more flaps and/or one or more rudders. For examples in which aircraft 100 comprises an over-fuselage mounted jet engine, empennage assembly 150 may be configured to be compatible with the over-fuselage mounted jet engine.

Both of example aircraft 700 and 800 of FIGS. 2-6 and FIG. 7, respectively, illustrates a specific example of an empennage assembly 150. As shown in these examples, empennage assembly 150 is disposed along aft region 114 of airframe 110 and comprises a V-tail empennage assembly 152. Empennage assembly 150 may comprise one or more flight control surfaces 160, and one or more flight control surface actuators 162 that may be utilized to maneuver aircraft 100. More specifically, in some examples, the empennage assembly comprises one or more rudders 154 that define trailing edge regions of empennage assembly 150 and may be configured to control air flowing over empennage assembly 150. Aircraft 800 comprises an over-fuselage mounted jet engine 180, and the V-tail empennage assembly 152 of is configured to be compatible with jet engine 180. More specifically, the V-tail empennage assembly 152 of aircraft 800 prevents exhaust from jet engine 180 from interfering with operation and/or function of empennage assembly 150.

While, in some examples, aircraft 100 comprises an empennage assembly, in other examples, aircraft 100 is configured to operate independently of an empennage assembly and thus may not include an empennage assembly. More specifically, the longitudinally separated blown surfaces defined by the forward wing assembly and the rear wing assembly, together with the respective blowing rotor assemblies and respective flight control surfaces, may provide sufficient flight stability to aircraft 100, such that an empennage assembly is not needed.

More broadly, the forward wing assembly 200 together with the forward blowing rotor assemblies 410, and the rear wing assembly 300 together with the rear blowing rotor assemblies 420 may be described a defining a four-zone thrust-vectoring configuration. In other words, when aircraft 100 comprises the forward left and right wing portions, and the rear left and right wing portions, each of the forward left wing portion, the forward right wing portion, the rear left wing portion, and the rear right wing portion may be described as a spatially separated flight zone of aircraft 100. Selective and independent actuation of the respective flight control surfaces comprised in each wing portion, such as to control lift and thrust induced by the respective subsets of blowing rotor assemblies, permits thrust-vectoring control over the four spatially separated zones of aircraft 100. Similarly, selective and independent actuation of the blowing power of each subset of blowing rotor assemblies associated with the four spatially separated zones also permits thrust-vectoring control over the four spatially separated zones of aircraft 100. In contrast to traditional blown-lift STOL aircraft, which comprise a single main blown wing, the four-zone thrust-vectoring configuration of aircraft 100 permits precise control (i.e., a high control authority) over pitching, yawing, rolling moments in aircraft 100. As such, while in some examples it is desirable for aircraft 100 to include an empennage assembly, an empennage assembly is not needed in aircraft 100, at least in part due to the precise control and stability afforded by the four-zone thrust-vectoring configuration of aircraft 100.

Moreover, aircraft 100 may offer reduced landing dispersion as compared to traditional blown-lift STOL, at least in part because of the high control authority afforded by the four-zone thrust-vectoring configuration. Stated another way, the four-zone thrust-vectoring configuration may facilitate controlled landing of aircraft 100. As more specific examples, aircraft 100 may be configured to land with a runway length of at most 30 meters, at most 40 meters, at most 50 meters, at most 60 meters, and/or at most 100 meters.

In some examples, aircraft 100 is configured to be operatively and selectively transitioned to and/or operated in a cruise configuration. In some examples, the cruise configuration is utilized between takeoff and landing, and/or when aircraft 100 has reached a cruising altitude. In some examples, the cruise configuration is configured to increase efficiency of aircraft 100, increase flight velocity of aircraft 100, and/or to reduce drag on aircraft 100.

FIGS. 6 and 7 illustrate examples of cruise configurations 190 of aircraft 700 and 800. As shown, in some examples, one or more forward blowing rotor assemblies 410 each comprise a blowing rotor 400 that is configured to fold into a low-profile configuration 460. Likewise, in some examples, one or more rear blowing rotor assemblies 420 comprise a blowing rotor 400 that is configured to fold into low-profile configuration 460. Stated another way, aircraft 100 may comprise any suitable number of blowing rotor assemblies that have a blowing rotor 400 that is configured to fold into the low-profile configuration. When blowing rotor 400 is configured to fold into the low-profile configuration, the respective blowing rotor assembly comprises one or more folding actuators that are configured to selectively and operatively facilitate folding of blowing rotor 400 into the low-profile configuration. When in low-profile configuration 460, blowing rotor 400 may be folded such that its blades are generally aligned with rotational axis 404. Folding blowing rotor 400 into low-profile configuration 460 may reduce drag imparted on aircraft by blowing rotor 400, such as by reducing an effective diameter of the blowing rotor 400. In some examples, folding blowing rotor 400 into low-profile configuration 460 optionally comprises ceasing rotation of blowing rotor 400. In some examples, blowing rotors 400 are configured to passively fold into low-profile configuration 460, such as a result of falling below a threshold rotational velocity. In other examples, blowing rotors 400 are configured to actively fold into low-profile configuration 460, such as the result of an actuator that is operatively controlled.

When aircraft 100 is in cruise configuration 190, blowing rotors 400 of any suitable number of forward blowing rotor assemblies may be in low-profile configuration 460. Likewise, when aircraft 100 is in cruise configuration 190, blowing rotors 400 of any suitable number of rear blowing rotor assemblies 420 may be in low-profile configuration 460. As shown in FIGS. 6 and 7, in some examples, blowing rotor 400 of each forward blowing rotor assembly 410 is in low-profile configuration 460 when aircraft 100 is in cruise configuration 190. In some examples, each blowing rotor 400 of a subset of the rear blowing rotor assemblies 420 is in low-profile configuration 460 when aircraft 100 is in cruise configuration 190. As illustrated in the specific example of FIG. 6, when aircraft 100 is in cruise configuration 190, at least one blowing rotor of each inboard subset of rear blowing rotor assemblies 442, 444 may be in low-profile configuration 460, and outboard subsets of rear blowing rotor assemblies 432, 434 may be in a regular or blowing configuration. By having an inboard subset of blowing rotor assemblies in low-profile configuration, the noise level within fuselage 120 may be reduced.

For examples in which aircraft 100 comprises jet engine 180, transitioning aircraft 100 to cruise configuration 190 may comprise activating jet engine 180. In some such examples, cruise configuration 190 comprises each blowing rotor 400 of forward blowing rotor assemblies 410 and each blowing rotor 400 of rear blowing rotor assemblies 420 being in low-profile configuration 460, such as illustrated in FIG. 7 in connection with example aircraft 800.

Turning back to FIG. 2, in some examples, aircraft 100 comprises one or more power sources 50 that are configured to supply power to various actuators of aircraft 100, such as motors 402 that rotate blowing rotors 400 of forward blowing rotor assemblies 410 and/or rear blowing rotor assemblies 420. As another example, when aircraft 100 comprises jet engine 180, power sources 50 optionally are configured to supply power to jet engine 180. Additionally or alternatively, the one or more power sources 50 are configured to supply power to actuate the flight control surface actuators 162 that adjust the one or more flight control surfaces 160. As an example, when motors 402 of forward blowing rotor assemblies 410 and/or rear blowing rotor assemblies 420 comprise electric motors, power sources 50 may supply electrical power to motors 402. In some examples, aircraft 100 is a fully electric aircraft and power sources 50 only comprise batteries. In some examples, power sources 50 additionally or alternatively comprise liquid fuel (e.g., petroleum-based jet fuel), such as to power jet engine 180. In some such examples, aircraft 100 is a hybrid electric aircraft that is powered by both electric batteries and fuel. Power sources 50 may be positioned in any suitable location within aircraft. As an example, one or more power sources 50 may be positioned along and/or within fuselage 120. Additionally or alternatively, one or more power sources 50 may be positioned along and/or within forward wing assembly 200 and/or rear wing assembly 300. As yet another example, one or more power sources 50 may be positioned within the component to which the one or more power sources 50 are configured to supply power. As a more specific example, one or more power sources 50 may be positioned within one or more motors 402 or motor assemblies thereof.

In some examples, aircraft 100 additionally comprises a controller 10 that is programmed to control various actuators of aircraft 100 (e.g., the blowing rotor assemblies, motors 402 of the blowing rotor assemblies, the flight control surface actuators 162, the blowing rotor folding actuators, and/or the jet engine 180). When included, controller 10 comprises a memory unit 44 and a processing unit 42. Memory unit 44 stores computer-readable instructions (the software) and processing unit 42 executes the stored computer-readable instructions to perform the various computer functions responsive to the various inputs, such as to selectively adjust the one or more flight control surfaces 160 responsive to a desired change in a pitching moment, a yawing moment, and/or a rolling moment of aircraft 100.

When included, memory unit 44 comprises non-volatile (also referred to herein as "non-transitory") memory 46 (e.g., ROM, PROM, and EPROM) and/or volatile (also referred to herein as "transitory") memory 45 (e.g., RAM, SRAM, and DRAM), in some examples. Processing unit 42 comprises integrated circuits including one or more of field-programmable gate arrays (FPGAs), application-specific integrated circuits (ASICs), digital signal processors (DSPs), microprocessors, microcontrollers, programmable array logic (PALs), and complex programmable logic devices (CPLDs).

As will be described in greater detail below, the controller 10 is programmed to execute various methods, such as methods 500 schematically represented in FIG. 9.

FIG. 8 schematically shows controller 10 included in an example of electrical system 20 of aircraft 100. In particular, FIG. 8 shows an example of how the one or more power sources 50 and the controller 10 are electrically coupled to some of the various actuators (e.g., the flight control surface actuators 162 and motors 402) of aircraft 100 to control operation of the actuators.

The electrical system schematically illustrated in FIG. 8 is an example of an electrical system that may be comprised in aircraft 100. Electrical connections between components are shown in dashed lines, and mechanical connections between components are shown in solid lines. In this example, electrical system 20 comprises the one or more power sources 50, the controller 10, and the various actuators that are controlled by the controller. In the example of FIG. 8, only a forward blowing rotor assembly 410, a motor 402 configured to power forward blowing rotor assembly 410, a flight control surface 160 (e.g., a forward flap) of forward wing assembly 200, and one or more flight control surface actuators 162 for actuating flight control surface 160 are illustrated. However, FIG. 8 depicts an illustrative, non-exclusive example of electrical system 20, and in many examples, electrical system 20 comprises additional actuators, such as flight control surface actuators for actuating other flight control surfaces (e.g. the rear flaps, additional forward flaps, and/or the rear ailerons), and actuators for actuating additional blowing rotor assemblies, (e.g., the other forward blowing rotor assemblies and the rear blowing rotor assemblies) that are not illustrated in the example of FIG. 8. Moreover, as discussed herein, the present disclosure is not limited to the electrical system 20 of the example FIG. 8 for controlling aircraft 100, and controller 10 and/or power sources 50 additionally or alternatively are utilized to control other components and/or aspects of aircraft 100, and/or may define related portions of other systems, such as liquid fuel delivery systems, to that illustrated in FIG. 8.

The one or more flight control surface actuators 162 are configured to selectively adjust forward flap 240, such as to direct air flowing across forward wing assembly 200, such as by pivoting forward flap 240 up or down. Flight control surface actuator 162 comprises one or more of an electromechanical, pneumatic, and hydraulic actuator that is configured to be electronically controlled by controller 10. In the example of FIG. 8, motor 402 of forward blowing rotor assembly 410 is an electric motor. Motor 402 is configured to selectively and operatively rotate blowing rotor 400 of forward blowing rotor assembly 410 about rotational axis 404 to control the blowing power of forward blowing rotor assembly 410, such as to regulate air blown across forward wing assembly 200 by forward blowing rotor assembly 410, and/or such as to regulate thrust induced in aircraft 100 and/or lift induced in forward wing assembly 200 by forward blowing rotor assembly 410.

Controller 10 is in electrical communication (e.g., wired and/or wireless communication) with the one or more power sources 50, the one or more flight control surface actuators 162, and the motor 402. Controller 10 receives electrical power from the one or more power sources 50, and selectively distributes the electrical power provided by the one or more power sources 50 to flight control surface actuators 162 and motor 402 according to a control scheme. In particular, methods 500 discussed below in relation to FIG. 9 describe an example control scheme that may be utilized by controller 10 to regulate the amount of electrical power supplied to one or more of flight control surface actuators 162 and motor 402.

More generally, in the example of FIG. 8, controller 10 sends command signals (e.g., digital signals) to one or more of motor 402 and the one or more flight control surface actuators 162 to adjust operation thereof. As described above, controller 10 is programmed to perform various actions, such as control the actuators described above, based on received input. In particular, controller 10 comprises computer-readable instructions stored in non-transitory memory 46, wherein the computer-readable instructions comprise instructions for controlling one or more of motor 402 and the one or more flight control surface actuators 162. The processing unit 42 is configured to execute the stored computer-readable instructions to control operation of one or more of motor 402 and the one or more flight control surface actuators 162.

In some examples, the present disclosure makes reference to controlling one or more of a pitching moment, a yawing moment, and a rolling moment in aircraft 100. As illustrated in connection with example aircraft 700 in FIG. 2, pitching moment 96, the yawing moment 94, and rolling moment 92 are defined in terms of principal axes 80. Principal axes 80 may be regarded as a right handed axes system. For the sake of clarity, FIG. 2 illustrates principal axes 80 positioned above aircraft 100, however, in the following discussion, the origin of principal axes 80 should be considered as being positioned at a center of gravity of aircraft 100. As shown, principal axes 80 comprises longitudinal axis (i.e., X axis) 82 that extends parallel to the length of aircraft 100, and positively towards nose region 112. Principal axes 80 also comprise a traverse axis 86 (i.e., Y axis) that extends generally parallel to forward wing assembly 200 and rear wing assembly 300 and perpendicular to longitudinal axis 82. Principal axes 80 further comprises a vertical axis 84 (i.e., Z axis) that extends perpendicular to longitudinal axis 82, generally perpendicular to forward wing assembly 200 and rear wing assembly 300, and parallel with gravity when the surface formed by longitudinal axis 82 and traverse axis 86 is normal to gravity.

As discussed herein, rotation of an aircraft 100 about vertical axis 84 is referred to as yaw, rotation of aircraft 100 about longitudinal axis 82 is referred to as roll, and rotation of aircraft 100 about traverse axis 86 is referred to as pitch. Thus, the pitching moment 96, the yawing moment 94, and the rolling moment 92 discussed herein refer to a moment in aircraft 100 that urges rotation of aircraft 100 about the respective principal axis, as discussed herein. In some examples, the following discussion makes reference to positive and negative pitching moments, rolling moments, and/or yawing moments. As defined herein, the direction of rotation indicated by the negative or positive sign is consistent with the right hand rule with respect to the corresponding principal axis.

FIG. 9 provides a flowchart that represents illustrative, non-exclusive examples of methods 500 for operating an aircraft, according to the present disclosure. In FIG. 9, some steps are illustrated in dashed boxes, indicating that such steps may be optional or may correspond to an optional version of methods 500, according to the present disclosure. That said, not all methods according to the present disclosure are required to include the steps illustrated in solid boxes. The methods and steps of FIG. 9 are not limiting and other methods and steps are within the scope of the present disclosure, including methods having greater than or fewer than the number of steps illustrated, as understood from the discussions herein. Each step or portion of methods 500 may be performed utilizing aircraft 100 and/or the features, functions, and/or portions thereof that are discussed in detail herein with respect to FIGS. 1-8. Likewise, any of the features, functions, and/or structures of the aircraft discussed herein with reference to FIG. 8 may be included in and/or utilized in aircraft 100 of FIGS. 1-8 without departing from the scope of the present disclosure.

In some examples, controller 10, as discussed above, is programed to perform one or more of the methods and steps illustrated in FIG. 9 and/or discussed herein. In some examples, instructions for performing the various steps and/or methods described herein are stored as computer-readable instructions in the non-transitory memory of controller 10. The processing unit 42 of controller 10 is configured to execute the computer-readable instructions to perform the one or more steps and methods illustrated in FIG. 9. In other examples, instructions for performing the various steps and/or methods described herein are stored remotely from aircraft 100, such as in the example of an aircraft 100 that is configured to be controlled remotely.

As illustrated in FIG. 9, methods 500 for operating an aircraft comprise inducing lift in a forward wing assembly of the aircraft by blowing air across the forward wing assembly with a forward plurality of blowing rotor assemblies at 502. Methods 500 for operating the aircraft further comprise inducing lift in a rear wing assembly of the aircraft by blowing air across the rear wing assembly with a rear plurality of blowing rotor assemblies at 504. In some examples, methods 500 comprise inducing thrust in the aircraft by blowing air rearwardly with the forward blowing rotor assemblies at 506, and/or inducing thrust in the aircraft by blowing air rearwardly with the rear blowing rotor assemblies at 508. In some examples, methods 500 for operating the aircraft comprise maneuvering the aircraft at 510, such as discussed in more detail herein. In some examples, methods 500 comprise transitioning the aircraft to a cruise configuration at 570 and/or inducing a jet thrust in the aircraft with a jet engine at 580.

As discussed in more detail herein with reference to FIGS. 1-7, the aircraft is a fixed-wing STOL aircraft. The forward blowing rotor assemblies are operatively coupled to the forward wing assembly proximate to leading edge regions of the forward wing assembly, and the rear blowing rotor assemblies are operatively coupled to the rear wing assembly proximate to leading edge regions of the rear wing assembly. As further discussed herein, the aircraft comprises the airframe, and the forward wing assembly is positioned forward of the rear wing assembly within the airframe.

In some examples, the forward wing assembly is positioned within the airframe forward of a center of gravity of the aircraft, and the rear wing assembly is positioned within the airframe rear of the center of gravity of the aircraft. In some examples, the discussion of FIG. 9 and methods 500 specifies that controlling lift in the forward wing assembly and controlling lift in the rear wing assembly operatively result in pitching moments being induced in the aircraft. It should be understood that, in some examples, inducing lift in the forward wing assembly and inducing lift in the rear wing assembly operatively result in opposing pitching moments being induced in the aircraft, as the forward and rear wing assemblies are longitudinally spaced across the center of gravity of the aircraft. Thus, as illustrative examples, in some examples, increasing lift in the forward wing assembly operatively results in a positive pitching moment in the aircraft, and in some examples, increasing lift in the rear wing assembly operatively results in a negative pitching moment in the aircraft. A similar logic may be applied to controlling lift and/or thrust in left and right wing portions of the forward wing assembly and/or the rear wing assembly, which extend in at least partially opposing directions with respect to the center of gravity of the aircraft.

In some examples, the discussion of FIG. 9 and methods 500 specifies that a particular step of methods 500, such as a particular adjusting step of the maneuvering at 510, "operatively results in" controlling one or more corresponding aspects of aircraft control. In some examples, a particular step of methods 500 that operatively results in controlling one or more corresponding aspects of aircraft control also may be understood as being performed to achieve, or produce, the one or more corresponding aspects of aircraft control. Stated another way, in some examples, performing a particular step of methods 500 comprises controlling one or more corresponding aspects of aircraft control.

With continued reference to FIG. 9, methods 500 comprise inducing lift in the forward wing assembly with the forward blowing rotor assemblies at 502. In some examples, the inducing lift at 502 comprises inducing lift in a forward portion of the aircraft. In some examples, the inducing at 502 comprises increasing an altitude of the aircraft. In some examples, the inducing at 502 comprises performing the inducing at 502 during takeoff of the aircraft, such as to induce a positive pitching moment in the aircraft, increase an altitude of the aircraft, and/or facilitate lifting of the aircraft from a runway. As indicated herein, a positive pitching moment refers to a pitching moment that urges a nose region in a negative direction along vertical axis 84. In some examples, performing the inducing at 502 permits the aircraft to takeoff with a runway length of at most 30 meters, at most 40 meters, at most 50 meters, at most 60 meters, and/or at most 100 meters. Additionally or alternatively, the inducing at 502 comprises performing the inducing at any suitable time while the aircraft is airborne, such as discussed in more detail herein with respect to the maneuvering at 510. As another example, performing the inducing at 502 comprises performing the inducing during a landing of the aircraft.

The inducing lift in the forward wing assembly with the forward blowing rotor assemblies at 502 is performed with any suitable timing or sequence within methods 500. As examples, the inducing at 502 may be performed prior to the inducing at 504, substantially simultaneously with the inducing at 504, substantially simultaneously with the inducing at 506 and/or the inducing at 508, prior to the maneuvering at 510, and/or substantially simultaneously with the maneuvering at 510. Stated another way, the inducing at 502 is performed with any suitable timing during operation of the aircraft.

As mentioned, methods 500 comprise inducing lift in the rear wing assembly with the rear blowing rotor assemblies at 504. The inducing at 504 is performed with any suitable sequence or timing within methods 500. As examples, the inducing at 504 may be performed prior to the inducing at 502, substantially simultaneously with the inducing at 502, substantially simultaneously with the inducing at 506 and/or the inducing at 508, prior to the maneuvering at 510, and/or substantially simultaneously with the maneuvering at 510. Stated another way, the inducing at 506 is performed with any suitable timing during operation of the aircraft. In some examples, the inducing at 504 comprises inducing lift in a rear portion of the aircraft. In some examples, the inducing at 504 comprises increasing an altitude of the aircraft.

In some examples, the inducing at 504 comprises performing the inducing at 504 during the takeoff of the aircraft, such as to induce lift in a rear portion of the aircraft, increase an altitude of the aircraft, and/or facilitate lifting of the aircraft from the runway. In some examples, performing the inducing at 504 permits the aircraft to takeoff with a runway length of at most 30 meters, at most 40 meters, at most 50 meters, at most 60 meters, or at most 100 meters. Additionally or alternatively, in some examples, the inducing at 504 is performed at any suitable time while aircraft is airborne. As another example, the methods 500 may comprise performing the inducing at 504 during landing of the aircraft and/or a descent of the aircraft, such as to induce a negative pitching moment in the aircraft. As indicated herein, a negative pitching moment refers to a pitching moment that urges a nose of the aircraft in a positive direction along vertical axis 84.

The inducing lift in the forward wing assembly with the forward blowing rotor assemblies at 502 comprises utilizing any suitable number, portion, or set, of the forward blowing assemblies. In some examples, the inducing at 502 comprises utilizing each forward blowing rotor assembly of the plurality of forward blowing rotor assemblies. In other examples, the inducing at 502 comprises utilizing a subset, or subsets, of the forward blowing rotor assemblies. Similarly, the inducing lift in the rear wing assembly with the rear blowing rotor assemblies at 504 comprises utilizing any suitable number, portion, or subset of the rear blowing rotor assemblies. In some examples, the inducing at 504 comprises utilizing each rear blowing rotor assembly, and in other examples, the inducing at 504 comprises utilizing a subset, or subsets, of the rear blowing rotor assemblies.

When the inducing at 502 and/or the inducing at 504 are performed during the landing of the aircraft, the inducing at 502 and/or the inducing at 504 may be performed to permit controlled landing of the aircraft and/or reduce a landing dispersion of the aircraft. In some examples, the inducing at 502 and/or the inducing at 504 are performed to counteract variable winds that are present during the landing. In some examples, performing the inducing at 502 and/or performing the inducing at 504 permits the aircraft to land with a runway length of at most 30 meters, at most 40 meters, at most 50 meters, at most 60 meters, and/or at most 100 meters.

As schematically represented in FIG. 9, in some examples, methods 500 comprise the inducing thrust in the aircraft by blowing air rearwardly with the forward plurality of blowing rotor assemblies at 506. When included in methods 500, the inducing at 506 is performed with any suitable timing or sequence within methods 500. As examples, the inducing at 506 may be performed prior to, substantially simultaneously with, and/or subsequent to the inducing thrust with the rear blowing rotor assemblies at 508. As more examples, the inducing may be performed substantially simultaneously with the inducing lift in the forward wing assembly with the forward blowing rotor assemblies at 502. Additionally or alternatively, the inducing at 506 is performed at any suitable timing during maneuvering at 510.

In some examples, the inducing thrust in the aircraft with the forward blowing rotor assemblies at 506 operatively results in, or comprises, increasing velocity of the aircraft. With this in mind, in some examples, methods 500 comprise performing the inducing during the takeoff of the aircraft. Additionally or alternatively, the inducing at 506 is performed at any suitable time while the aircraft is airborne, for example, such as to increase flight velocity of the aircraft. As a more specific example, performing the inducing at 506 while the aircraft is oriented at a positive pitch angle may operatively result in the aircraft climbing in altitude.

As mentioned, in some examples, methods 500 comprise the inducing thrust in the aircraft by blowing air rearwardly with the rear plurality of blowing rotor assemblies at 508. When included in methods 500, the inducing at 508 is performed with any suitable sequence or timing within methods 500. In some examples, the inducing at 508 is performed substantially simultaneously with the inducing lift in the rear wing assembly with the rear blowing rotor assemblies at 504, and/or during the maneuvering at 510. As more examples, the inducing at 508 may be performed prior to, substantially simultaneously with, and/or subsequent to the inducing at 506. In some examples, the inducing at 508 comprises increasing the velocity of the aircraft, and may be performed for similar reasons to that discussed herein with respect to the inducing at 506.

As discussed herein with respect to the inducing lift at 502 and inducing lift at 504, the inducing thrust at 506 and the inducing thrust at 508 comprise utilizing any suitable number, subset, or fraction of the respective blowing rotor assemblies. In some examples, the inducing thrust at 506 comprises utilizing each blowing rotor assembly of the forward plurality of blowing rotor assemblies. In other examples, the inducing thrust at 506 comprises utilizing a subset, or subsets, of the forward blowing rotor assemblies. Similarly, in some examples, the inducing thrust at 508 comprises utilizing each blowing rotor assembly of the rear blowing rotor assemblies, and in other examples, the inducing thrust at 508 comprises utilizing a subset, or subsets, of the rear blowing rotor assemblies.

With continued reference to FIG. 9, methods 500 optionally comprise maneuvering the aircraft at 510. When included in methods 500, the maneuvering at 510 comprises any suitable sub-steps, operations, and/or sequences thereof that are performed to maneuver the aircraft as desired. When included in methods 500, the maneuvering at 510, and/or any suitable sequence or portion of sub-steps thereof, is performed with any suitable sequence or timing within methods 500. Stated another way, when included in methods 500, the maneuvering at 510, and/or any suitable sequence or portion of sub-steps thereof, is performed with any suitable timing during operation of the aircraft. As examples, the maneuvering at 510, and/or any suitable sequence or portion of sub-steps thereof, may be performed during the takeoff of the aircraft, during the landing of the aircraft, and/or at any suitable time while aircraft is airborne.

In some examples, the maneuvering at 510 comprises adjusting a blowing power of one or more of the forward blowing rotor assemblies, the rear blowing rotor assemblies, and/or subsets thereof. As discussed in more detail herein with reference to FIGS. 1-8, in some examples, the one or more of the forward blowing rotor assemblies and/or one or more of the rear blowing rotor assemblies comprise a blowing rotor that is configured to rotate to blow and/or propel air. In some such examples, one or more of the forward blowing rotor assemblies and/or one or more of the rear blowing rotor assemblies comprises a motor that is configured to power rotation of a respective blowing rotor.

In some examples, the adjusting the blowing power comprises adjusting a rotation rate of the blowing rotor(s) of any suitable number, or subset, or portion of the forward blowing rotor assemblies and/or the rear blowing rotor assemblies. In some examples, the adjusting the blowing power comprises regulating an amount of power directed to motor(s) of any suitable number, subset, or portion of the forward blowing rotor assemblies and/or the rear blowing rotor assemblies, such as to adjust the rotation rate(s) of the respective blowing rotor(s). As discussed herein, in some examples, one or more of the blowing rotor motors are electric motors and/or are electrically powered. Thus, in some examples, the adjusting the blowing power comprises regulating an amount of electrical power directed to the motor(s) of any suitable number, portion, or subset of the forward blowing rotor assemblies and/or the rear blowing rotor assemblies.

In some examples, the maneuvering at 510 comprises adjusting one or more flight control surfaces. As discussed in more detail herein, in some examples, the aircraft comprises one or more of forward flaps, rear flaps, ailerons, and/or empennage rudders. As such, in some examples the maneuvering at 510 comprises adjusting one or more of the forward flaps, the rear flaps, the ailerons, and/or the empennage rudders, such as by selectively actuating respective flight control surface actuators.

As more specific examples, and with continued reference to the examples of FIG. 9, the maneuvering at 510 may comprise adjusting the blowing power of the forward blowing rotor assemblies at 520, adjusting the blowing power of the rear blowing rotor assemblies at 522, and/or adjusting the blowing power of outboard subsets of the rear blowing rotor assemblies at 524. Additionally or alternatively, the maneuvering at 510 may comprise adjusting the forward flaps at 530, adjusting the rear flaps at 532, adjusting the empennage rudder(s) at 536, and/or adjusting the ailerons at 534.

As mentioned, in some examples, the maneuvering at 510 comprises adjusting the blowing power of the forward blowing rotor assemblies at 520. As shown in FIG. 9, in some examples, the adjusting at 520 comprises, or operatively results in, controlling thrust induced in the aircraft by the forward blowing rotor assemblies at 540. Additionally or alternatively, the adjusting at 520 comprises, or operatively results in, controlling lift induced in the forward wing assembly at 550.

In some examples, the adjusting at 520 comprises increasing the blowing power of the forward blowing rotor assemblies, and in other examples, the adjusting at 520 comprises decreasing the blowing power of the forward blowing rotor assemblies. For some examples in which the adjusting at 520 comprises increasing the blowing power, the adjusting at 520 operatively results in increasing thrust induced in the aircraft by the forward blowing rotor assemblies at 540, and for some examples in which the adjusting at 520 comprises the decreasing the blowing power, the adjusting at 520 operatively results in decreasing the thrust induced in the aircraft by the forward blowing rotor assemblies. Additionally or alternatively, for some examples in which the adjusting at 520 comprises increasing the blowing power, the adjusting at 520 comprises increasing lift induced in the forward wing assembly by the forward blowing rotor assemblies at 550, and for some examples in which the adjusting at 520 comprises decreasing the blowing power, the adjusting at 520 comprises decreasing lift induced in the forward wing assembly by the forward blowing rotor assemblies at 550. In some examples, increasing lift in the forward wing assembly at 550 operatively results in a positive pitching moment in the aircraft at 560, and in some examples decreasing lift in the forward wing assembly at 550 operatively results in a negative pitching moment in the aircraft at 560.

In some examples, the adjusting the blowing power at 520 is performed to control the pitching moment in the aircraft at 560. Stated another way, in some examples, the adjusting at 520 operatively results in, or comprises, controlling the pitching moment in the aircraft at 560. As a more specific example, for some examples in which the adjusting at 520 comprises increasing the blowing power, such as to operatively result in increasing lift at 550, the adjusting at 520 also operatively results in, or comprises, inducing a positive pitching moment in the aircraft at 560. As another more specific example, for some examples in which the adjusting at 520 comprises decreasing the blowing power, such as to operatively result in reducing lift at 550, the adjusting at 520 also operatively results in, or comprises, inducing a negative pitching moment in the aircraft at 560.

As further shown in FIG. 9, in some examples, the maneuvering at 510 comprises adjusting the blowing power of the rear blowing rotor assemblies at 522. In some examples, the adjusting the blowing power at 522 operatively results in controlling thrust induced in the aircraft by the rear blowing rotor assemblies at 542. Additionally or alternatively, in some examples, the adjusting the blowing power at 522 comprises controlling lift induced in the rear wing assembly by the rear blowing rotor assemblies at 552. The adjusting at 522 may comprise increasing or decreasing the blowing power of the rear blowing rotor assemblies.

As discussed herein with reference to the adjusting at 520, in some examples, when the adjusting comprises increasing the blowing power, the adjusting at 520 operatively results in increasing lift induced in the rear wing assembly by the rear blowing rotor assemblies at 552, and/or increasing thrust induced in the aircraft by the rear blowing rotor assemblies 542. In some examples, when the adjusting at 522 comprises decreasing the blowing power of the rear blowing rotor assemblies, the adjusting at 522 operatively results in decreasing lift induced in the rear wing assembly by the rear blowing rotor assemblies at 552, and/or decreasing thrust induced in the aircraft by the rear blowing rotor assemblies at 542.

In some examples, the adjusting at 522 is performed to control the pitching moment in the aircraft at 560. Stated another way, in some examples, the adjusting at 520 operatively results in, or comprises, controlling the pitching moment in the aircraft at 560. As a more specific example, when the adjusting at 522 comprises decreasing the blowing power of the rear blowing rotor assemblies, such as to decrease lift in the rear wing assembly, the adjusting at 522 may operatively result in, or comprise, inducing a positive pitching moment in the aircraft at 560. Similarly, when the adjusting at 522 comprises increasing the blowing power of the rear blowing rotor assemblies, such as to increase lift in the rear wing assembly, the adjusting at 522 may operatively result in, or comprise, inducing a negative pitching moment in the aircraft at 560.

When included in the maneuvering at 510, the adjusting the blowing power of the forward blowing rotor assemblies at 520 and/or the adjusting the blowing power of the rear blowing rotor assemblies at 522 are performed with any suitable sequence and timing within methods 500. In some examples, the adjusting at 520 comprises maintaining the blowing power of the forward blowing rotor assemblies, and in some examples, the adjusting at 522 comprises maintaining the blowing power of the rear blowing rotor assemblies. In some examples, the maneuvering at 510 comprises substantially simultaneously increasing the blowing power of the forward blowing rotor assemblies at 520 and the rear blowing rotor assemblies at 522, and subsequently maintaining the blowing power of the forward and rear blowing rotor assemblies, such as to increase altitude and/or velocity of the aircraft.

With continued reference to FIG. 9, in some examples, the maneuvering at 510 comprises adjusting the blowing power of outboard subsets of the rear blowing rotor assemblies at 524. As discussed in more detail herein, in some examples, the rear blowing rotor assemblies comprise outboard subsets that are operatively coupled to the rear wing assembly proximate to outboard portions of the leading edge of the rear wing assembly. In some such examples, the rear blowing rotor assemblies comprise a rear left outboard subset operatively coupled to the rear left wing portion and a rear right outboard subset operatively coupled to the rear right wing portion.

With this in mind, in some examples, the adjusting at 524 comprises adjusting the blowing power of the rear left outboard subset of blowing rotor assemblies. Additionally or alternatively, the adjusting at 524 comprises adjusting the blowing power of the rear right outboard subset of blowing rotor assemblies. In some examples, the adjusting at 524 comprises adjusting the blowing power of the rear left and right outboard subsets of the blowing rotor assemblies independently of one another.

As discussed herein with reference to the adjusting at 520 and the adjusting at 522, the adjusting at 524 may comprise increasing the blowing power or decreasing the blowing power of the outboard subsets of the rear blowing rotor assemblies. In some examples, the adjusting at 524 is performed to control thrust induced in the outboard portions of the rear wing assembly by the outboard subsets of the rear blowing rotor assemblies at 544. Stated another way, in some examples, the adjusting at 524 operatively results in, or comprises, controlling thrust induced in the outboard portions of the rear wing assembly at 544. In some examples, the adjusting at 524 is performed to control the yawing moment in the aircraft at 562. Stated another way, in some examples, the adjusting at 524 operatively results in, or comprises, controlling the yawing moment in the aircraft at 562.

More specifically, in some examples, the adjusting at 524 comprises increasing the blowing power of the rear left outboard subset of blowing rotor assemblies, which, in some examples, operatively results in increasing thrust induced in the outboard portion of rear left wing portion by the rear left outboard subset of blowing rotor assemblies at 544. In some examples, the increasing thrust in the outboard portion of the rear left wing portion at 544 operatively results in a positive yawing moment in the aircraft at 562. Thus, in some examples, the adjusting at 524 comprises increasing the blowing power of the rear left outboard subset of blowing rotor assemblies to induce a positive yawing moment in the aircraft.

In some examples, the adjusting at 524 comprises decreasing the blowing power of the rear left outboard subset of blowing rotor assemblies which, in some examples, operatively results in decreasing thrust induced in the outboard portion of the rear left wing portion by the rear left outboard subset of blowing rotor assemblies at 544. In some examples, the decreasing thrust in the left outboard portion of the rear left wing portion at 544 operatively results in a negative yawing moment in the aircraft at 562. Thus, in some examples, the adjusting at 524 comprises decreasing the blowing power of the rear left outboard subset of blowing rotor assemblies to induce the negative yawing moment in the aircraft at 562.

Similarly, in some examples, the adjusting at 524 comprises increasing or decreasing the blowing power of the rear right outboard subset of blowing rotor assemblies. In such examples, increasing the blowing power of the rear right outboard subset of blowing rotor assemblies at 524 may operatively result in, or comprises, increasing thrust in the rear right wing portion at 544, which may operatively result in a negative yawing moment in the aircraft at 562. Thus, in some examples, the adjusting at 524 comprises increasing the blowing power of the rear right outboard subset of blowing rotor assemblies to induce a negative yawing moment in the aircraft at 562. Likewise, in some examples, the adjusting at 524 comprises decreasing the blowing power of the rear right outboard subset of blowing rotor assemblies, which in some such examples, operatively results in decreasing thrust in the rear right wing portion at 544 and a positive yawing moment in the aircraft at 562. Thus, in some examples, the adjusting at 524 comprises decreasing the blowing power of the rear right outboard subset of blowing rotor assemblies to induce a positive yawing moment in the aircraft at 562.

With continued reference to FIG. 9, in some examples, the maneuvering at 510 comprises adjusting one or more flight control surfaces of the aircraft. As discussed herein, in some examples, the aircraft comprises an empennage assembly, and in some such examples, the empennage assembly comprises one or more rudders that may be configured to control lift in the empennage assembly.

In some examples, the maneuvering at 510 comprises adjusting the one or more empennage rudders at 536. In some examples, the adjusting at 536 operatively results in, or comprises, controlling lift in one or more portions of the empennage assembly at 556, and in some such examples, the controlling at 556 operatively results in, or comprises, the controlling the yawing moment in the aircraft at 562. Thus, in some examples, the adjusting at 536 is performed to control the yawing moment in the aircraft at 562.

When included in methods 500, the adjusting at 536 may be performed with any suitable sequence or timing within methods 500. In some examples, the adjusting at 536 is performed substantially simultaneously with adjusting the blowing power of the outboard subsets of rear blowing rotor assemblies at 524. Stated another way, in some examples, the adjusting at 536 and the adjusting at 524 are performed substantially simultaneously to control the yawing moment of the aircraft at 562.

As discussed herein, in some examples, the aircraft comprises one or more forward flaps that define trailing edges of the forward wing assembly. When included in the aircraft, the forward flaps are configured to direct air flowing over the forward wing assembly, such as air blow by the forward blowing rotor assemblies. More specifically, in some examples, the forward flaps are configured to be adjusted up and down by a respective set of one or more flight control surface actuators, such as to control lift in the forward wing assembly and/or thrust induced in the aircraft by the forward blowing rotor assemblies.

As schematically represented in FIG. 9, in some examples, the maneuvering at 510 comprises the adjusting the forward flaps at 530. In some examples, the adjusting at 530 comprises adjusting the forward flaps up, and in other examples, the adjusting comprises adjusting the forward flaps down. In some examples, the adjusting at 530 operatively results in, or comprises, controlling lift in the forward wing assembly at 550, such as lift induced by the forward blowing rotor assemblies, and in some examples, the adjusting at 530 operatively results in, or comprises, controlling thrust induced in the aircraft by the forward blowing rotor assemblies. In some examples, the adjusting at 530 operatively results in, or comprises, controlling the pitching moment in the aircraft at 560.

As a more specific example, when the adjusting at 530 comprises adjusting the forward flaps down, the adjusting at 530 may operatively result in, or comprise, increasing lift in the forward wing assembly at 550, and/or decreasing thrust induced in the aircraft by the forward blowing rotor assemblies at 540. As discussed herein, in some examples, the increasing lift in the forward wing assembly at 550 operatively results in a positive pitching moment in the aircraft at 560. Thus, in some examples, the adjusting at 530 comprises adjusting the forward flaps down to induce a positive pitching moment in the aircraft at 560.

Similarly, when the adjusting at 530 comprises adjusting the forward flaps up, the adjusting at 530 may operatively result in, or comprise, decreasing lift in the forward wing assembly at 550 and/or increasing thrust at 540. As discussed herein, in some examples, decreasing lift in the forward wing assembly at 550 operatively results in a negative pitching moment in the aircraft at 560. Thus, in some examples, the adjusting at 530 comprises adjusting the forward flaps up to induce a negative pitching moment in the aircraft at 560.

The adjusting at 530 may be performed at any suitable timing during operation of the aircraft. In some examples, the adjusting the forward flaps down at 530 is performed during takeoff and/or to increase altitude of the aircraft which, in some examples, is performed substantially simultaneously with the increasing the blowing power of the forward blowing rotor assemblies at 520. In some examples, the adjusting the forward flaps down at 530 is performed when the aircraft has reached a cruising altitude. In some examples, the adjusting at 530 comprises maintaining the forward flaps at desired deflection, such as to maintain lift in the forward wing assembly at 550.

As discussed herein, in some examples, the aircraft comprises one or more rear flaps that may define inboard portions of the trailing edge of the rear wing assembly. In some examples, the rear flaps are configured to direct air flowing over the rear wing assembly, such as air blown by the inboard subsets of the rear blowing rotor assemblies.

As schematically represented in FIG. 9, in some examples, the maneuvering at 510 comprises adjusting the rear flaps at 532. The adjusting at 530 may comprise adjusting the rear flaps up or adjusting the rear flaps down. In some examples, the adjusting at 532 operatively results in controlling lift in the rear wing assembly at 552, such as lift induced by the inboard subsets of the rear blowing rotor assemblies. Additionally or alternatively, the adjusting at 532 comprises controlling thrust induced in the aircraft by the rear blowing rotor assemblies at 542. In some examples, the adjusting at 532 operatively results in, or comprises, controlling the pitching moment in the aircraft at 560.

As more specific examples, when the adjusting at 532 comprises adjusting the rear flaps down, the adjusting at 532 may operatively result in increasing lift in the rear wing assembly at 542, and/or decreasing the thrust induced in the aircraft by the inboard subsets of the rear blowing rotor assemblies. When the adjusting at 532 comprises adjusting the rear flaps up, the adjusting at 532 may operatively result in, or comprise, decreasing lift in the rear wing assembly at 542, and/or increasing thrust induced in the aircraft by the inboard subsets of the rear blowing rotor assemblies. As discussed herein, in some examples, increasing lift in the rear wing assembly operatively results in inducing a negative pitching moment in the aircraft, and in some examples decreasing lift in the rear wing assembly operatively results in inducing a positive pitching moment in the aircraft. Thus, in some examples, adjusting the rear flaps down at 532 is performed to induce a negative pitching moment in the aircraft, and adjusting the rear flaps up at 532 is performed to induce a positive pitching moment in the aircraft.

Additionally or alternatively, in some examples, adjusting the rear flaps up at 532 is performed once the aircraft has reached a cruising altitude. As another example, in some examples, the adjusting the rear flaps down at 532 is performed substantially simultaneously with the adjusting the forward flaps down at 530, which may be performed during takeoff of the aircraft and/or performed to increase an altitude of the aircraft. Thus, as discussed herein, the adjusting at 532 is performed with any suitable timing during operation of the aircraft.

As discussed herein, in some examples, the aircraft comprises ailerons that may define outboard portions of the trailing edge of the rear wing assembly. In some examples, the ailerons are configured to direct air flowing across the outboard portions of the rear wing assembly, such as air blown by the outboard subsets of the rear blowing rotor assemblies. In some such examples, the ailerons comprise a left aileron that defines an outboard portion of the trailing edge of the rear left wing portion and a right aileron that defines an outboard portion of the trailing edge of the rear right wing portion.

With continued reference to FIG. 9, in some examples, the maneuvering at 510 comprises adjusting the ailerons at 534.

In some examples, the adjusting at 534 comprises adjusting the left aileron, and in some examples, the adjusting at 534 comprises adjusting the right aileron. In some examples, the adjusting at 534 comprises adjusting the right and left ailerons independently of one another. In some examples, the adjusting at 534 comprises adjusting the right aileron and/or the left aileron up or down. In some examples, the adjusting at 534 operatively results in, or comprises, controlling lift in the outboard portions of the rear wing assembly at 554. In some examples, controlling lift in the outboard portions of the rear wing assembly at 554 operatively results in controlling a rolling moment in the aircraft at 564. Thus, in some examples, the adjusting at 534 is performed to control the rolling moment in the aircraft at 564.

As more specific examples, when the adjusting at 534 comprises adjusting the left aileron down, the adjusting at 534 may operatively result in, or comprise, increasing lift in the outboard portion of the rear left wing portion at 554, such as lift induced by the left outboard subset of the rear blowing rotor assemblies. As another example, when the adjusting at 534 comprises adjusting the left aileron up, the adjusting at 534 may operatively result in, or comprise, decreasing lift in the outboard portion of the rear left wing portion at 554, such as lift induced by the left outboard subset of the rear blowing rotor assemblies. In some examples, increasing lift in the outboard portion of the rear left wing portion operatively results in a positive rolling moment in the aircraft at 564, and in some examples, decreasing lift in the outboard portion of the rear left wing portion operatively results in a negative pitching moment in the aircraft at 564. Thus, in some examples the adjusting at 534 comprises adjusting the left aileron down to induce a positive rolling moment in the aircraft at 564, and in some examples, the adjusting at 534 comprises adjusting the left aileron up to induce a negative rolling moment in the aircraft at 564.

Similarly, when the adjusting at 534 comprises adjusting the right aileron down, the adjusting at 534 may operatively result in, or comprise, increasing or decreasing lift in the outboard portion of the rear right wing portion, such as lift induced by the right outboard subset of the rear blowing rotor assemblies. In some examples, increasing or decreasing lift in the outboard portion of the rear right wing portion operatively results in inducing a negative or a positive rolling moment in the aircraft at 564, respectively. Thus, in some examples, the adjusting at 534 comprises adjusting the right aileron down to induce a negative rolling moment in the aircraft at 564, and in some examples, the adjusting at 534 comprises adjusting the right aileron up to induce a positive rolling moment in the aircraft at 564.

In some examples, the adjusting at 534 comprises adjusting the left aileron and the right aileron substantially simultaneously, such as to induce a desired rolling moment in the aircraft.

As discussed herein with respect to the adjusting at 520 and 522, the adjusting the forward flaps at 530, the adjusting the rear flaps at 532, and/or the adjusting the ailerons at 534 may comprise maintaining the respective fight control surface at a desired deflection.

As discussed herein, any subset, or portion, of the substeps of the maneuvering at 510 may be performed in any suitable sequence such as to maneuver the aircraft through a desired operation. As an example, the maneuvering at 510 may be performed to maneuver the aircraft through takeoff and/or landing.

More specifically, in some examples, maneuvering the aircraft through a takeoff comprises increasing the blowing power of the forward blowing rotor assemblies at 520 to increase lift induced in the forward wing assembly at 550 and increase thrust induced in the aircraft at 540, adjusting the forward flaps down at 530 to increase lift induced in the forward wing assembly at 550 and induce a positive pitching moment in the aircraft at 560, increasing the blowing power of the rear blowing rotor assemblies at 522 to increase lift induced in the rear wing assembly at 552 and increase thrust induced in the aircraft at 542, and controlling an acceleration of the aircraft along and away from a runway surface responsive to the thrust induced at 540 and 542 and the lift induced at 550 and 552.

In some examples, maneuvering the aircraft through a landing comprises reducing the blowing power of the forward blowing rotor assemblies at 520 to decrease thrust in the aircraft at 540, reducing blowing power of the rear blowing rotor assemblies at 522 to decrease thrust in the aircraft at 542, adjusting the forward flaps down at 530 to increase lift induced in the forward wing assembly at 550, and adjusting the rear flaps down at 532 to increase lift in the rear wing assembly at 552.

As discussed herein with reference to FIGS. 6 and 7, in some examples, the aircraft is configured to be selectively transitioned to a cruise configuration. More specifically, in some examples, one or more of the forward blowing rotor assemblies and/or one or more of the rear blowing rotor assemblies comprises a blowing rotor that is configured to selectively fold into a low-profile configuration, such as while the aircraft is in the cruise configuration. Additionally or alternatively, in some examples, the aircraft comprises a jet engine that is configured to be activated while the aircraft is in the cruise configuration.

As illustrated in FIG. 9, in some examples, methods 500 comprise transitioning the aircraft to a cruise configuration at 570. Transitioning the aircraft to the cruise configuration at 570 may be performed with any suitable sequence or timing within methods and/or during operation of the aircraft. As examples, the transitioning at 570 may be performed subsequent to takeoff, once the aircraft has reached a cruising altitude, and/or prior to landing. As more examples, the transitioning at 570 may be performed subsequent to the inducing at 504, subsequent to the inducing at 508, and/or prior to the inducing at 580.

In some examples, the transitioning at 570 comprises selectively folding the blowing rotor(s) of any suitable number or portion of the forward blowing rotor assemblies into the low-profile configuration, and in some examples, the transitioning at 570 comprises selectively folding the blowing rotor(s) of any suitable number or portion of the rear blowing rotor assemblies into the low-profile configuration. As a more specific example, the transitioning at 570 optionally comprises selectively folding each blowing rotor of the forward blowing rotor assembly into the low-profile configuration. Additionally or alternatively, the transitioning at 570 comprises folding each blowing rotor of the inboard subsets of blowing rotor assemblies into the low-profile configuration. As another example, the transitioning at 570 may comprise folding each blowing rotor of the forward blowing rotor assemblies and each blowing rotor of the rear blowing rotor assemblies into the low-profile configuration.

In some examples, the transitioning at 570 comprises adjusting the forward flaps up and the rear flaps up, such as to reduce drag on the aircraft. In some examples, the transitioning at 570 comprises activating the jet engine.

As shown in FIG. 9, in some examples, methods 500 comprise inducing jet thrust in the aircraft with the jet engine at 580. The inducing at 580 may be performed with any suitable sequence or timing within methods 500. In some examples, the inducing at 580 is performed subsequent to, and/or substantially simultaneously with the transitioning at 570. More specifically, for examples in which the transitioning at 570 comprises activating the jet engine, the inducing at 580 is performed subsequent to the activating at 570.

In some examples, the inducing at 580 comprises inducing jet thrust in the aircraft by increasing a propulsion power of jet engine. In some examples, the inducing at 580 comprises increasing flight velocity of the aircraft. As a more specific example, the inducing at 580 may be performed to provide thrust to the aircraft while at least a portion of the forward blowing rotor assemblies, and/or at least a portion of the rear blowing rotor assemblies are folded into the low-profile configuration, and/or while the aircraft is in the cruise configuration.

Illustrative, non-exclusive examples of inventive subject matter according to the present disclosure are described in the following enumerated paragraphs:

A1. An aircraft comprising:
an airframe comprising a rear wing assembly and a forward wing assembly positioned forward of the rear wing assembly;
a rear plurality of blowing rotor assemblies operatively coupled to the rear wing assembly proximate to leading edge regions of the rear wing assembly, wherein the rear plurality of blowing rotor assemblies are configured to blow air across the rear wing assembly to induce lift in the rear wing assembly; and
a forward plurality of blowing rotor assemblies operatively coupled to the forward wing assembly proximate to leading edge regions of the forward wing assembly, wherein the forward plurality of blowing rotor assemblies are configured to blow air across the forward wing assembly to induce lift in the forward wing assembly.

A1.1 The aircraft of paragraph A1, wherein the aircraft is a fixed-wing aircraft, wherein the forward wing assembly is non-rotatably fixed within the airframe, and wherein the rear wing assembly is non-rotatably fixed within the airframe.

A2. The aircraft of any of paragraphs A1-A1.1, wherein the forward plurality of blowing rotor assemblies and the rear plurality of blowing rotor assemblies further are configured to propel air rearwardly to induce thrust in the aircraft.

A3. The aircraft of any of paragraphs A1-A2, wherein each blowing rotor assembly of the forward plurality of blowing rotor assemblies and each blowing rotor assembly of the rear plurality of blowing rotor assemblies is configured to be independently operated.

A4. The aircraft of paragraph A3, wherein each blowing rotor assembly of the forward plurality of blowing rotor assemblies and each blowing rotor assembly of the rear plurality of blowing rotor assemblies assembles is configured to output a differential blowing power responsive to independent operation to control one or more of:
(i) a pitching moment in the aircraft;
(ii) a yawing moment in the aircraft;
(ii) a rolling moment in the aircraft; and
(iv) a velocity of the aircraft.

A4.1 The aircraft of any of paragraphs A1-A4, wherein the forward plurality of blowing rotor assemblies comprises a forward left subset of blowing rotor assemblies that are operatively coupled to a forward left wing portion of the forward wing assembly and a forward right subset of blowing rotor assemblies that are operatively coupled to a forward right wing portion of the forward wing assembly, wherein the rear plurality of blowing rotor assemblies comprises a rear left subset of blowing rotor assemblies that are operatively coupled to a rear left wing portion of the rear wing assembly and a rear right subset of blowing rotor assemblies that are operatively coupled to a rear right wing portion of the rear wing assembly; and wherein each of the forward left subset of blowing rotor assemblies, the forward right subset of blowing rotor assemblies, the rear left subset of blowing rotor assemblies, and the rear right subset of blowing rotor assemblies are configured to be independently operated to permit four-zone thrust vectoring control over the aircraft.

A5. The aircraft of any of paragraphs A1-A4.1, wherein the forward plurality of blowing rotor assemblies and the rear plurality of blowing rotor assemblies are electrically powered.

A6. The aircraft of any of paragraphs A1-A5, wherein each blowing rotor assembly of the forward plurality of blowing rotor assemblies and each blowing rotor assembly of the rear plurality of blowing rotor assemblies comprises a blowing rotor that is powered by a respective motor, and wherein each blowing rotor is configured to rotate to blow air responsive to receiving power from the respective motor.

A6.1 The aircraft of paragraph A6, wherein each motor of the forward plurality of blowing rotor assemblies and each motor of the rear plurality of blowing rotor assemblies is an electric motor.

A7. The aircraft of any of paragraphs A6-A6.1, wherein the blowing rotor of one or more of the forward plurality of blowing rotor assemblies is configured to selectively fold into a low-profile configuration.

A8. The aircraft of any of paragraphs A6-A7, wherein the blowing rotor of one or more of the rear plurality of blowing rotor assemblies is configured to selectively fold into a low-profile configuration.

A9. The aircraft of any of paragraphs A6-A8, wherein each blowing rotor is configured to rotate on a fixed axis of rotation, wherein the fixed axis of rotation is fixed relative to a longitudinal axis of the aircraft.

A10. The aircraft of any of paragraphs A1-A9, wherein the forward plurality of blowing rotor assemblies comprises at least 4 forward blowing rotor assemblies, at least 6 forward blowing rotor assemblies, at least 8 forward blowing rotor assemblies, or at most 10 forward blowing rotor assemblies.

A10.1 The aircraft of paragraph A10, wherein the forward plurality of blowing rotor assemblies comprises 6 blowing rotor assemblies.

A11. The aircraft of any of paragraphs A1-A10.1, wherein the rear plurality of blowing rotor assemblies comprises at least 6 rear blowing rotor assemblies, at least 8 rear blowing rotor assemblies, at least 10 rear blowing rotor assemblies, at least 12 rear blowing rotor assemblies, or at most 18 rear blowing rotor assemblies.

A11.1 The aircraft of paragraph A11, wherein the rear plurality of blowing rotor assemblies comprises 12 blowing rotor assemblies.

A12. The aircraft of any of paragraphs A1-A11.1, wherein the aircraft further comprises a jet engine that is operatively coupled to the airframe.

A13. The aircraft of any of paragraphs A1-A12, wherein the airframe further comprises a fuselage having an internal volume that is configured to receive a payload, and wherein the forward wing assembly and the rear wing assembly are operatively coupled to the fuselage.

A14. The aircraft of paragraph A13, wherein the fuselage is configured to support the payload with a center of weight of the payload positioned between the forward wing assembly and the rear wing assembly.

A15. The aircraft of any of paragraphs A13-A14, when depending from claim A12, wherein the jet engine is mounted over the fuselage.

A16. The aircraft of any of paragraphs A13-A15, wherein the fuselage comprises one or more access doors configured to permit access to the internal volume of the fuselage.

A17. The aircraft of paragraph A16, wherein each access door of the one or more access doors is positioned along the fuselage between the forward wing assembly and the rear wing assembly.

A18. The aircraft of any of paragraphs A16-A17, wherein at least one door of the one or more access doors is configured to pivot open rearwardly to shield to at least a portion of the rear plurality of blowing rotor assemblies.

A19. The aircraft of any of paragraphs A16-A17, wherein at least one access door of the one or more access doors comprises a rear access door portion that is configured to pivot open rearwardly to shield ingress and egress to the fuselage from at least a portion of the rear plurality of blowing rotor assemblies and a forward access door portion that is configured to pivot open forwardly to shield ingress and egress to the fuselage from at least a portion of the forward plurality of blowing rotor assemblies.

A20. The aircraft of any of paragraphs A13-A19, when depending from paragraph A13, wherein the fuselage comprises a tapered rear region to permit the aircraft to takeoff with a steep pitch-up angle.

A21. The aircraft of paragraph A20, wherein the aircraft defines a pitch-up clearance angle, and wherein the pitch-up clearance angle is at least 10 degrees, at least 15 degrees, at least 20 degrees, and at least 30 degrees.

A22. The aircraft of any of paragraphs A1-A21, wherein the aircraft further comprises a landing gear assembly that is configured to support the aircraft on a ground surface.

A23. The aircraft of paragraph A22, wherein the landing gear assembly comprises a forward portion that is positioned within the airframe proximally below the forward wing assembly and a rear portion that is positioned within the airframe proximally below the rear wing assembly.

A24. The aircraft of any of paragraphs A1-A23, wherein the forward wing assembly and the rear wing assembly are longitudinally separated along a length of the aircraft by a longitudinal separation.

A25. The aircraft of paragraph A24, wherein the longitudinal separation is defined as a threshold fraction of a total length of the aircraft, and wherein the threshold fraction is at most 75%.

A26. The aircraft of any of paragraphs A1-A25, wherein the rear wing assembly is positioned within the airframe at a waterline that is higher than a waterline of the forward wing assembly.

A27. The aircraft of paragraphs A1-A26, wherein the forward wing assembly is a canard wing assembly.

A28. The aircraft of any of paragraphs A1-A27, wherein the forward wing assembly and the rear wing assembly are separated along a height of the aircraft by a vertical separation.

A29. The aircraft of any of paragraphs A1-A28, wherein each blowing rotor assembly of the forward plurality of blowing rotor assemblies and each blowing rotor of the rear plurality of blowing rotor assemblies has a spinning diameter.

A29.1 The aircraft of paragraph A29, wherein at least 80% of the spinning diameter of each forward blowing rotor assembly extends below a leading edge region of the forward wing assembly and at most 20% of the spinning diameter of each forward blowing rotor assembly extends above the leading edge region of the forward wing assembly, and wherein at least 80% of the spinning diameter of each rear blowing rotor assembly extends below a leading edge region of the rear wing assembly and at most 20% of the spinning diameter of each rear blowing rotor assembly extends above the leading edge region of the rear wing assembly.

A30. The aircraft of paragraph A29, when depending from A28, wherein the spinning diameter of each blowing rotor assembly of the forward plurality of blowing rotor assemblies is vertically non-overlapping with the spinning diameter of each blowing rotor assembly of the rear plurality of blowing rotor assemblies.

A31. The aircraft of paragraph A29, when depending from paragraph A28, wherein the vertical separation is defined as a threshold fraction of a maximum extent of the spinning diameters of the rear plurality of blowing rotor assemblies, wherein the threshold fraction is at least 110%.

A32. The aircraft of any of paragraphs A29-A31, wherein a cumulative spinning diameter of the forward plurality of blowing rotor assemblies is a threshold fraction of a total extensive length of the forward wing assembly, wherein the threshold fraction is at least 50%, at least 60%, at least 70%, at least 80%, at least 90%, or at most 95%.

A32.1 The aircraft of paragraph A32, wherein the threshold fraction defines a blown surface percentage of the forward wing assembly.

A33. The aircraft of any of paragraphs A29-A32, wherein a cumulative spinning diameter of the rear plurality of blowing rotor assemblies is a threshold fraction of a total extensive length of the rear wing assembly, wherein the threshold fraction is at least 50%, at least 60%, at least 70%, at least 80%, at least 90%, or at most 95%.

A33.1 The aircraft of paragraph A33, wherein the threshold fraction defines a blown surface percentage of the rear wing assembly.

A34. The aircraft of any of paragraphs A29-A33.1, wherein the spinning diameter of each blowing rotor assembly of the forward plurality of blowing rotor assemblies is a threshold fraction of an average blown width of the forward wing assembly, wherein the threshold fraction is at most 20%, at most 30%, at most 40%, at most 50%, at most 60%, at most 70%, at most 80%, or at most 90%.

A34.1 The aircraft of paragraph A34, wherein the threshold fraction is at most 50%.

A35. The aircraft of any of paragraphs A29-A34.1, wherein the spinning diameter of each blowing rotor assembly of the rear plurality of blowing rotor assemblies is a threshold fraction of an average blown width of the rear wing assembly, wherein the threshold fraction is at most 20%, at most 30%, at most 40%, at most 50%, at most 60%, at most 70%, at most 80%, or at most 90%.

A35.1 The aircraft of paragraph A35, wherein the threshold fraction is at most 50%.

A36. The aircraft of any of paragraphs A1-A35.1, wherein the airframe further comprises an empennage assembly that is positioned along an aft region of the airframe.

A37. The aircraft of paragraph A36, wherein the empennage assembly is compatible with an over-fuselage mounted jet engine.

A38. The aircraft of any of paragraphs A36-A37, wherein the empennage assembly is a V-tail empennage assembly.

A39. The aircraft of any of paragraphs A1-A35, wherein the aircraft is configured to operate independently of an empennage assembly.

A40. The aircraft of any of paragraphs A1-39, wherein the forward wing assembly comprises:

a forward left wing portion having a forward left flap that defines at least a portion of a trailing edge of the forward left wing portion;

a forward right wing portion having a forward right flap that defines at least a portion of a trailing edge of the forward right wing portion; and wherein the forward plurality of blowing rotor assemblies comprises a forward left subset of blowing rotor assemblies operatively coupled to the forward left wing portion and a forward right subset of blowing rotor assemblies operatively coupled to the forward right wing portion.

A41. The aircraft of paragraph A40, wherein the forward left flap is configured to control lift induced in the forward left wing portion by directing air blown across the forward left wing portion by the forward left subset of blowing rotor assemblies, and wherein the forward right flap is configured to control lift induced in the forward right wing portion by directing the air blown across the forward right wing portion by the forward right subset of blowing rotor assemblies.

A42. The aircraft of any of paragraphs A1-A41, wherein the rear wing assembly comprises:

a rear right wing portion comprising a rear right flap that defines an inboard portion of a trailing edge of the rear right wing portion;

a rear left wing portion comprising a rear left flap that defines an inboard portion of a trailing edge of the rear left wing portion; and wherein the rear plurality of blowing rotor assemblies comprises a rear left subset of blowing rotor assemblies operatively coupled to the rear left wing portion and a rear right subset of blowing rotor assemblies operatively coupled to the rear right wing portion, and wherein the rear left subset of blowing rotor assemblies comprises a rear left inboard subset of blowing rotor assemblies and the rear right subset of blowing rotor assemblies comprises a rear right inboard subset of blowing rotor assemblies.

A43. The aircraft of paragraph A42, wherein the rear left flap is configured to adjust lift induced in the rear left wing portion by directing air blown across the rear left wing portion by the rear left inboard subset of blowing rotor assemblies and the rear right flap is configured to adjust lift induced in the rear right wing portion by directing air blown across the rear right wing portion by the rear right inboard subset of blowing rotor assemblies.

A44. The aircraft of any of paragraphs A42-A43, wherein the rear right wing portion further comprises a right aileron that defines an outboard portion of the trailing edge of the rear right wing portion, and wherein the rear left wing portion further comprises a left aileron that defines an outboard portion of the trailing edge of the rear left wing portion.

A44.1 The aircraft of paragraph A44, wherein the left aileron is configured to adjust lift induced in the rear left wing portion by directing air blown across the rear left wing portion by a left outboard subset of the rear plurality of blowing rotor assemblies and the right aileron is configured to adjust lift induced in the rear right wing portion by directing air blown across the rear right wing portion by a right outboard subset of the rear plurality of blowing rotor assemblies.

A45. The aircraft of any of paragraphs A1-A44.1, further comprising a controller, the controller comprising:

non-transitory memory comprising computer readable instructions for executing the methods of any of paragraphs B1-B28; and a processor for executing the computer readable instructions to perform the methods of any of paragraphs B1-B28.

A46. The aircraft of any of paragraphs A1-A45, wherein the aircraft is an autonomous aircraft.

A47. The aircraft of any of paragraphs A1-A46, wherein the aircraft is a remote controlled aircraft.

A48. The aircraft of any of paragraphs A1-A47, wherein the aircraft is configured to takeoff with a runway length of at most 30 meters, at most 35 meters, at most 40 meters, at most 50 meters, at most 60 meters, or at most 100 meters.

A49. The aircraft of any of paragraphs A1-A48, wherein the aircraft is configured to land with a runway length of at most 30 meters, at most 35 meters, at most 40 meters, at most 50 meters, at most 60 meters, or at most 100 meters.

A50. The aircraft of any of paragraphs A1-A49, wherein the forward wing assembly together with the forward plurality of blowing rotor assemblies and the rear wing assembly together with the rear plurality of blowing rotor assemblies define a four-zone thrust vectoring configuration.

A51. The aircraft of paragraph A50, wherein the four-zone thrust vectoring configuration facilitates controlled landing of the aircraft.

A52. The aircraft of any of paragraphs A1-A51, wherein lift induced in the forward wing assembly by the forward plurality of blowing rotor assemblies permits the aircraft to takeoff with a runway length of at most 30 meters.

B1. A method of operating an aircraft, the method comprising:
inducing lift in a forward wing assembly of the aircraft by blowing air across a forward wing assembly with a forward plurality of blowing rotor assemblies that are operatively coupled to the forward wing assembly proximate to leading edge regions of the forward wing assembly; and
inducing lift in a rear wing assembly of the aircraft by blowing air across a rear wing assembly with a rear plurality of blowing rotor assemblies that are operatively coupled to the rear wing assembly proximate to leading edge regions of the rear wing assembly.

B1.1 The method of paragraph B1, wherein the aircraft is a fixed-wing aircraft, wherein the forward wing assembly is non-rotatably fixed within an airframe of the aircraft, and wherein the rear wing assembly is non-rotatably fixed within the airframe.

B2. The method of any of paragraphs B1-B1.1, further comprising inducing thrust in the aircraft by propelling air rearwardly with the forward plurality of blowing rotor assemblies and inducing thrust in the aircraft by propelling air rearwardly with the rear plurality of blowing rotor assemblies.

B3. The method of any of paragraphs B1-B2, further comprising, maneuvering the aircraft by adjusting a blowing power of the forward plurality of blowing rotor assemblies.

B4. The method of paragraph B3, wherein the adjusting the blowing power of the forward plurality of blowing rotor assemblies comprises at least one of:
(i) increasing the blowing power of the forward plurality of blowing rotor assemblies to induce a positive pitching moment in the aircraft; and
(ii) decreasing the blowing power of the forward plurality of blowing rotor assemblies to induce a negative pitching moment in the aircraft.

B5. The method of any of paragraphs B3-B4, wherein the forward plurality of blowing rotor assemblies are electrically powered, and wherein the adjusting the blowing power of the forward plurality of blowing rotor assemblies comprises adjusting an electrical power directed to the forward plurality of blowing rotor assemblies.

B6. The method of any of paragraphs B1-135, further comprising, maneuvering the aircraft by adjusting forward flaps of the forward wing assembly to direct air blown across the forward wing assembly by the forward plurality of blowing rotor assemblies.

B7. The method of paragraph B6, wherein the adjusting the forward flaps comprises at least one of:
(i) adjusting the forward flaps down to increase lift induced in the forward wing assembly;
(ii) adjusting the forward flaps down to induce a/the positive pitching moment in the aircraft;
(iii) adjusting the forward flaps up to decrease lift induced in the forward wing assembly; and
(iv) adjusting the forward flaps up to induce a/the negative pitching moment in the aircraft.

B8. The method of any of any of paragraphs B1-B7, further comprising, maneuvering the aircraft by adjusting rear flaps of the rear wing assembly to direct air blown across the rear wing assembly by inboard subsets of the rear plurality of blowing rotor assemblies.

B9. The method of paragraph B8, wherein the adjusting the rear flaps comprises at least one of:
(i) adjusting the rear flaps down to increase lift induced in the rear wing assembly;
(ii) adjusting the rear flaps down to induce a/the negative pitching moment in the aircraft;
(iii) adjusting the rear flaps up to decrease lift induced in the rear wing assembly; and
(iv) adjusting the rear flaps up to induce a/the positive pitching moment in the aircraft.

B10. The method of any of paragraphs B1-B9, further comprising, maneuvering the aircraft by adjusting a blowing power of the rear plurality of blowing rotor assemblies.

B11. The method of paragraph B10, wherein the adjusting the blowing power of the rear plurality of blowing rotor assemblies comprises at least one of:
(i) increasing a blowing power of the rear plurality of blowing rotor assemblies to increase lift induced in the rear wing assembly; and
(ii) increasing the blowing power of the rear plurality of blowing rotor assemblies to induce a/the negative pitching moment in the aircraft.

B12. The method of any of paragraphs B10-1311, wherein the rear plurality of blowing rotor assemblies are electrically powered, and wherein the adjusting the blowing power of the rear plurality of blowing rotor assemblies comprises adjusting an electrical power directed to the rear plurality of blowing rotor assemblies.

B13. The method of any of paragraphs B1-B12, further comprising maneuvering the aircraft by adjusting ailerons that comprise outboard portions of trailing edges of the rear wing assembly to direct air blown across outboard portions of the rear wing assembly by outboard subsets of the rear plurality of blowing rotor assemblies.

B14. The method of paragraph B13, wherein the adjusting the ailerons comprises controlling lift induced in the outboard portions of the rear wing assembly by the outboard subsets of the rear plurality of blowing rotor assemblies.

B15. The method of any of paragraphs B13-B14, wherein the rear wing assembly comprises a left wing portion and a right wing portion, wherein the ailerons comprise a left aileron that defines the outboard portion of the trailing edge of the left rear wing portion and a right aileron that defines the outboard portion of the trailing edge of the right rear wing portion, wherein the rear plurality of blowing rotor assemblies comprise a rear left outboard subset operatively coupled to the outboard position of the left rear wing portion and a rear right outboard subset operatively coupled to the outboard position of the right rear wing portion, and wherein the maneuvering the aircraft further comprises at least one of:

(i) adjusting the left aileron down to increase lift induced in the outboard portion of the rear left wing portion by the rear left outboard subset of blowing rotor assemblies;

(ii) adjusting the right aileron down to increase lift induced in the outboard portion of the rear right wing portion by the rear right outboard subset of blowing rotor assemblies;

(iii) adjusting the left aileron down to induce a positive rolling moment in the aircraft;

(iv) adjusting the right aileron down to induce a negative rolling moment in the aircraft;

(v) adjusting the left aileron up to induce the negative rolling moment in the aircraft; and (vi) adjusting the right aileron up to induce the positive rolling moment in the aircraft.

B16. The method of any of paragraphs B1-B15, further comprising maneuvering the aircraft by adjusting a blowing power of a/the outboard subsets of the rear plurality of blowing rotor assemblies.

B17. The method of paragraph B16, wherein the adjusting the blowing power of the outboard subsets of the rear plurality of blowing rotor assemblies comprises controlling thrust induced in the outboard portions of the rear wing assembly by the outboard subsets of the rear plurality of blowing rotor assemblies.

B18. The method of any of paragraphs B16-B17, wherein the rear plurality of blowing rotor assemblies comprises a rear left outboard subset operatively coupled to the outboard portion of a/the left rear wing portion of the rear wing assembly and a rear right outboard subset operatively coupled to the outboard portion of a/the right rear wing portion of the rear wing assembly, and wherein the maneuvering the aircraft further comprises at least one of:

(i) increasing the blowing power of the rear left outboard subset of blowing rotor assemblies to induce a positive yawing moment in the aircraft;

(ii) increasing the blowing power of the rear right outboard subset of blowing rotor assemblies to induce a negative yawing moment in the aircraft;

(iii) decreasing the blowing power of the rear left outboard subset of blowing rotor assemblies to induce the negative yawing moment in the aircraft; and (iv) decreasing the blowing power of the rear right outboard subset of blowing rotor assemblies to induce the positive yawing moment in the aircraft.

B19. The method of paragraph B18, further comprising adjusting one or more rudders that define one or more trailing edge portions of an empennage assembly of the aircraft to control lift in the empennage assembly and a yawing moment in the aircraft.

B20. The method of any of paragraphs B1-B19, further comprising increasing a/the blowing power of one or more of the forward plurality of blowing rotor assemblies and the rear plurality of blowing rotor assemblies to increase thrust in the aircraft.

B21. The method of paragraph B20, wherein the increasing the blowing power of the one or more of the forward plurality of blowing rotor assemblies and the rear plurality of blowing rotor assemblies comprises increasing velocity of the aircraft.

B22. The method of any of paragraphs B1-B21, wherein the aircraft further comprises a jet engine, and wherein the method further comprises inducing a jet thrust in the aircraft by increasing a propulsion power of the jet engine, wherein the inducing the jet thrust comprises increasing velocity of the aircraft.

B23. The method of any of paragraphs B1-B22, further comprising selectively transitioning the aircraft to a cruise configuration.

B24. The method of paragraph B23, wherein each blowing rotor assembly of the forward plurality of blowing rotor assemblies comprises a blowing rotor, and wherein the selectively transitioning comprises folding each blowing rotor of at least a subset of the forward plurality of blowing rotor assemblies into a low-profile configuration.

B25. The method of any of paragraphs B23-B24, wherein each blowing rotor assembly of the rear plurality of blowing rotor assemblies comprises a blowing rotor, wherein the rear plurality of blowing rotor assemblies comprises inboard subsets of blowing rotor assemblies, and wherein the selectively transitioning comprises folding each blowing rotor of the inboard subsets into a low-profile configuration.

B26. The method of any of paragraphs B23-B25, wherein the selectively transitioning comprises one or more of adjusting a/the forward flaps up and adjusting a/the rear flaps up.

B27. The method of any of paragraphs B1-B26, further comprising maneuvering the aircraft through a takeoff by:

(i) increasing a/the blowing power of the forward plurality of blowing rotor assemblies to increase lift induced in the forward wing assembly and induce thrust in the aircraft;

(ii) adjusting a/the forward flaps down to increase lift induced in the forward wing assembly by the forward plurality of blowing rotor assemblies and to increase a/the pitching moment in the aircraft;

(iii) increasing a/the blowing power of the rear plurality of blowing rotor assemblies to increase lift in the rear wing assembly and to induce thrust in the aircraft; and (iv) controlling acceleration of the aircraft along and away from a runway surface responsive to the thrust in the aircraft, lift induced in the forward wing assembly, and lift induced in the rear wing assembly.

B28. The method of any of paragraphs B1-B27, further comprising maneuvering the aircraft through a landing by:

(i) reducing a/the blowing power of the forward plurality of blowing rotor assemblies to decrease thrust in the aircraft;

(ii) reducing a/the blowing power of the rear plurality of blowing rotor assemblies to decrease thrust in the aircraft;

(iii) adjusting a/the forward flaps down to increase lift in the forward wing assembly; and (iv) adjusting a/the rear flaps down to increase lift in the rear wing assembly.

B29. The method of any of paragraphs B1-B29, wherein the aircraft comprises the aircraft of any of paragraphs A1-A52.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A fixed-wing short-takeoff-and-landing aircraft comprising:
   an airframe comprising a rear wing assembly and a forward wing assembly positioned forward of the rear wing assembly, wherein the forward wing assembly is non-rotatably fixed within the airframe, and wherein the rear wing assembly is non-rotatably fixed within the airframe;
   a rear plurality of blowing rotor assemblies operatively coupled to the rear wing assembly proximate to leading edge regions of the rear wing assembly, wherein the rear plurality of blowing rotor assemblies are configured to blow air across the rear wing assembly to induce lift in the rear wing assembly; and
   a forward plurality of blowing rotor assemblies operatively coupled to the forward wing assembly proximate to leading edge regions of the forward wing assembly, wherein the forward plurality of blowing rotor assemblies are configured to blow air across the forward wing assembly to induce lift in the forward wing assembly;
   wherein the airframe further comprises a fuselage having an internal volume that is configured to receive a payload, wherein the forward wing assembly and the rear wing assembly are operatively coupled to the fuselage and longitudinally separated along a length of the fuselage, wherein the fuselage comprises one or more access doors that are configured to permit access to the internal volume of the fuselage, wherein each access door of the one or more access doors is positioned along the fuselage between the forward wing assembly and the rear wing assembly, wherein each access door of the one or more access doors comprises a rear access door portion that is configured to pivot open rearwardly to shield ingress and egress to the fuselage from at least a portion of the rear plurality of blowing rotor assemblies and a forward access door portion that is configured to pivot open forwardly to shield ingress and egress to the fuselage from at least a portion of the forward plurality of blowing rotor assemblies.

2. The aircraft of claim 1, wherein each blowing rotor assembly of the forward plurality of blowing rotor assemblies and each blowing rotor assembly of the rear plurality of blowing rotor assemblies comprises a blowing rotor that is configured to rotate on a fixed axis of rotation, and wherein the fixed axis of rotation is fixed relative to a longitudinal axis of the aircraft.

3. The aircraft of claim 1, wherein each blowing rotor assembly of the forward plurality of blowing rotor assemblies and each blowing rotor assembly of the rear plurality of blowing rotor assemblies comprises a blowing rotor, wherein the blowing rotor of one or more of the forward plurality of blowing rotor assemblies is configured to selectively fold into a low-profile configuration, and wherein the blowing rotor of one or more of the rear plurality of blowing rotor assemblies is configured to selectively fold into a low-profile configuration.

4. The aircraft of claim 1, wherein the rear plurality of blowing rotor assemblies comprises 12 blowing rotor assemblies.

5. The aircraft of claim 1, wherein the forward plurality of blowing rotor assemblies comprises 6 blowing rotor assemblies.

6. The aircraft of claim 1, wherein the forward wing assembly and the rear wing assembly are separated along a length of the aircraft by a longitudinal separation, wherein the longitudinal separation is defined as a threshold fraction of a total length of the aircraft, wherein the threshold fraction is at most 75%.

7. The aircraft of claim 1, wherein each blowing rotor assembly of the forward plurality of blowing rotor assemblies and each blowing rotor assembly of the rear plurality of blowing rotor assemblies has a spinning diameter, and wherein the spinning diameter of each blowing rotor assembly of the forward plurality of blowing rotor assemblies is vertically non-overlapping with the spinning diameter of each blowing rotor assembly of the rear plurality of blowing rotor assemblies.

8. The aircraft of claim 1, wherein each blowing rotor assembly of the forward plurality of blowing rotor assemblies and each blowing rotor assembly of the rear plurality of blowing rotor assemblies comprises a blowing rotor that has a spinning diameter, wherein the spinning diameter of each blowing rotor of the forward plurality of blowing rotor assemblies is a threshold fraction of an average blown width of the forward wing assembly, and the spinning diameter of each blowing rotor of the rear plurality of blowing rotor assemblies is a threshold fraction of an average blown width of the rear wing assembly, wherein the threshold fraction of the spinning diameter of each blowing rotor of the forward plurality of blowing rotor assemblies is at most 50%, and wherein the threshold fraction of the spinning diameter of each blowing rotor of the rear plurality of blowing rotor assemblies is at most 50%.

9. The aircraft of claim 1, wherein the rear wing assembly comprises:
   a rear right wing portion comprising a rear right flap that defines an inboard portion of a trailing edge of the rear right wing portion, and a right aileron that defines an outboard portion of the trailing edge of the rear right wing portion; and a rear left wing portion comprising a rear left flap that defines an inboard portion of a trailing edge of the rear left wing portion, and a left aileron that defines an outboard portion of the trailing edge of the rear left wing portion;

wherein the rear left flap is configured to adjust lift induced in the rear left wing portion by directing air blown across the rear left wing portion by a left inboard subset of the rear plurality of blowing rotor assemblies, and the rear right flap is configured to adjust lift induced in the rear right wing portion by directing air blown across the rear right wing portion by a right inboard subset of the rear plurality of blowing rotor assemblies; and wherein the left aileron is configured to adjust lift induced in the rear left wing portion by directing air blown across the rear left wing portion by a left outboard subset of the rear plurality of blowing rotor assemblies, and the right aileron is configured to adjust lift induced in the rear right wing portion by directing air blown across the rear right wing portion by a right outboard subset of the rear plurality of blowing rotor assemblies.

10. The aircraft of claim 1, wherein the aircraft is configured to takeoff and land with a runway length of at most 35 meters.

11. The aircraft of claim 1, wherein each blowing rotor assembly of the forward plurality of blowing rotor assemblies and each blowing rotor assembly of the rear plurality of blowing rotor assemblies is configured to be independently operated; and wherein each blowing rotor assembly of the forward plurality of blowing rotor assemblies and each blowing rotor assembly of the rear plurality of blowing rotor assemblies is configured to output a differential blowing power responsive to independent operation to control one or more of:
(i) a pitching moment in the aircraft;
(ii) a yawing moment in the aircraft;
(ii) a rolling moment in the aircraft; and
(iv) a velocity of the aircraft.

12. The aircraft of claim 1, wherein the forward plurality of blowing rotor assemblies comprises a forward left subset of blowing rotor assemblies that are operatively coupled to a forward left wing portion of the forward wing assembly and a forward right subset of blowing rotor assemblies that are operatively coupled to a forward right wing portion of the forward wing assembly, wherein the rear plurality of blowing rotor assemblies comprises a rear left subset of blowing rotor assemblies that are operatively coupled to a rear left wing portion of the rear wing assembly and a rear right subset of blowing rotor assemblies that are operatively coupled to a rear right wing portion of the rear wing assembly; and wherein each of the forward left subset of blowing rotor assemblies, the forward right subset of blowing rotor assemblies, the rear left subset of blowing rotor assemblies, and the rear right subset of blowing rotor assemblies are configured to be independently operated to permit four-zone thrust vectoring control over the aircraft.

13. The aircraft of claim 1, wherein the forward plurality of blowing rotor assemblies and the rear plurality of blowing rotor assemblies are electrically powered.

14. The aircraft of claim 1, wherein the aircraft further comprises a jet engine that is operatively coupled to the airframe.

15. The aircraft of claim 1, wherein the fuselage comprises a tapered rear region to permit the aircraft to takeoff with a steep pitch-up angle, wherein the aircraft defines a pitch-up clearance angle, and wherein the pitch-up clearance angle is at least 15 degrees.

16. The aircraft of claim 1, further comprising a jet engine operatively coupled to the airframe.

17. A method of operating the fixed-wing short-takeoff-and-landing aircraft of claim 1, the method comprising:
inducing lift in the forward wing assembly of the aircraft by blowing air across the forward wing assembly with the forward plurality of blowing rotor assemblies; and
inducing lift in the rear wing assembly of the aircraft by blowing air across the rear wing assembly with the rear plurality of blowing rotor assemblies.

18. A fixed-wing short-takeoff-and-landing aircraft comprising:
an airframe comprising a rear wing assembly and a forward wing assembly positioned forward of the rear wing assembly, wherein the forward wing assembly is non-rotatably fixed within the airframe, and wherein the rear wing assembly is non-rotatably fixed within the airframe;
a rear plurality of blowing rotor assemblies operatively coupled to the rear wing assembly proximate to leading edge regions of the rear wing assembly, wherein the rear plurality of blowing rotor assemblies are configured to blow air across the rear wing assembly to induce lift in the rear wing assembly; and
a forward plurality of blowing rotor assemblies operatively coupled to the forward wing assembly proximate to leading edge regions of the forward wing assembly, wherein the forward plurality of blowing rotor assemblies are configured to blow air across the forward wing assembly to induce lift in the forward wing assembly;
wherein each blowing rotor assembly of the forward plurality of blowing rotor assemblies and each blowing rotor assembly of the rear plurality of blowing rotor assemblies comprises a blowing rotor that is configured to rotate on a fixed axis of rotation, and wherein the fixed axis of rotation is fixed relative to a longitudinal axis of the aircraft;
wherein the blowing rotor of one or more of the forward plurality of blowing rotor assemblies is configured to selectively fold into a low-profile configuration, and wherein the blowing rotor of one or more of the rear plurality of blowing rotor assemblies is configured to selectively fold into a low-profile configuration;
wherein each blowing rotor assembly of the forward plurality of blowing rotor assemblies and each blowing rotor assembly of the rear plurality of blowing rotor assemblies has a spinning diameter, and wherein the spinning diameter of each blowing rotor assembly of the forward plurality of blowing rotor assemblies is vertically non-overlapping with the spinning diameter of each blowing rotor assembly of the rear plurality of blowing rotor assemblies;
wherein each blowing rotor has a spinning diameter, wherein the spinning diameter of each blowing rotor of the forward plurality of blowing rotor assemblies is a threshold fraction of an average blown width of the forward wing assembly, and the spinning diameter of each blowing rotor of the rear plurality of blowing rotor assemblies is a threshold fraction of an average blown width of the rear wing assembly, wherein the threshold fraction of the spinning diameter of each blowing rotor of the forward plurality of blowing rotor assemblies is at most 50%, and wherein the threshold fraction of the spinning diameter of each blowing rotor of the rear plurality of blowing rotor assemblies is at most 50%;

wherein each blowing rotor assembly of the forward plurality of blowing rotor assemblies and each blowing rotor assembly of the rear plurality of blowing rotor assemblies is configured to be independently operated, and wherein each blowing rotor assembly of the forward plurality of blowing rotor assemblies and each blowing rotor assembly of the rear plurality of blowing rotor assemblies is configured to output a differential blowing power responsive to independent operation to control one or more of:

(i) a pitching moment in the aircraft;

(ii) a yawing moment in the aircraft;

(ii) a rolling moment in the aircraft; and (iv) a velocity of the aircraft; and wherein the forward plurality of blowing rotor assemblies and the rear plurality of blowing rotor assemblies are electrically powered.

19. A method of operating the fixed-wing short-takeoff-and-landing aircraft of claim 18, the method comprising:

inducing lift in the forward wing assembly of the aircraft by blowing air across the forward wing assembly with the forward plurality of blowing rotor assemblies; and inducing lift in the rear wing assembly of the aircraft by blowing air across the rear wing assembly with the rear plurality of blowing rotor assemblies.

20. The aircraft of claim 18, further comprising a jet engine operatively coupled to the airframe.

\* \* \* \* \*

UNITED STATES PATENT AND TRADEMARK OFFICE
CERTIFICATE OF CORRECTION

| | |
|---|---|
| PATENT NO. | : 11,472,546 B2 |
| APPLICATION NO. | : 16/799393 |
| DATED | : October 18, 2022 |
| INVENTOR(S) | : Tony Shuo Tao |

It is certified that error appears in the above-identified patent and that said Letters Patent is hereby corrected as shown below:

On the Title Page

Item (71) should be changed to --AURORA FLIGHT SCIENCES CORPORATION, a subsidiary of THE BOEING COMPANY, Manassas, VA (US)--; and Item (73) should be changed to --AURORA FLIGHT SCIENCES CORPORATION, a subsidiary of THE BOEING COMPANY, Manassas, VA (US)--.

Signed and Sealed this
Seventeenth Day of January, 2023

Katherine Kelly Vidal
*Director of the United States Patent and Trademark Office*